US012703194B2

(12) United States Patent
Nakata et al.

(10) Patent No.: US 12,703,194 B2
(45) Date of Patent: Aug. 11, 2026

(54) RECORDING DEVICE

(71) Applicant: SEIKO EPSON CORPORATION, Tokyo (JP)

(72) Inventors: Satoshi Nakata, Matsumoto (JP); Hirokazu Anada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 116 days.

(21) Appl. No.: 18/783,473

(22) Filed: Jul. 25, 2024

(65) Prior Publication Data

US 2025/0033386 A1 Jan. 30, 2025

(30) Foreign Application Priority Data

Jul. 25, 2023 (JP) ................................ 2023-120563

(51) Int. Cl.
*B41J 13/10* (2006.01)
*B41J 29/13* (2006.01)

(52) U.S. Cl.
CPC ............. *B41J 13/103* (2013.01); *B41J 29/13* (2013.01); *B65H 2402/441* (2013.01)

(58) Field of Classification Search
CPC ........................... B65H 2402/441; B65H 1/04; B65H 2407/21; B65H 2405/115; G03G 21/1633; G03G 15/6514; G03G 2215/00392; G03G 2221/1672; B41J 29/13; B41J 13/103; B41J 11/0045; H04N 1/00525
See application file for complete search history.

(56) References Cited

U.S. PATENT DOCUMENTS

| | | | | |
|---|---|---|---|---|
| 5,052,670 | A * | 10/1991 | Makiura | B65H 9/04 271/22 |
| 6,953,190 | B2 * | 10/2005 | Shin | B65H 3/06 271/157 |
| 2015/0084277 | A1 * | 3/2015 | Maruyama | B65H 5/062 271/272 |
| 2018/0034986 | A1 | 2/2018 | Ishida et al. | |
| 2018/0246458 | A1 * | 8/2018 | Okamoto | G03G 15/6511 |
| 2019/0227478 | A1 * | 7/2019 | Kikura | B41J 29/13 |
| 2020/0331277 | A1 * | 10/2020 | Asada | B65H 3/0684 |
| 2022/0267109 | A1 * | 8/2022 | Nakajima | B65H 3/0653 |
| 2022/0382208 | A1 * | 12/2022 | Tateishi | G03G 15/6514 |

FOREIGN PATENT DOCUMENTS

| | | |
|---|---|---|
| JP | 2007049512 A | 2/2007 |
| JP | 2018016050 A | 2/2018 |

* cited by examiner

*Primary Examiner* — John P Zimmermann
(74) *Attorney, Agent, or Firm* — CHIP LAW GROUP

(57) ABSTRACT

A recording device includes a placement section configured to pivot about a first pivot shaft between a use state and a stored state, the placement section being configured to support a medium to be recorded on by a recording section; a housing that accommodates the recording section and in which is formed a sheet feeding port; a cover section configured to pivot about a second pivot shaft between a covering state that covers at least a part of the sheet feeding port and an open state that opens up the sheet feeding port; and an interlocking section that pivots the cover section, and that pivots the cover section, wherein the cover section in the open state is in a posture along the placement section in the stored state and the sheet feeding port is between the first pivot shaft and the second pivot shaft.

14 Claims, 31 Drawing Sheets

RECORDING DEVICE

The present application is based on, and claims priority from JP Application Serial Number 2023-120563, filed Jul. 25, 2023, the disclosure of which is hereby incorporated by reference herein in its entirety.

BACKGROUND

1. Technical Field

The present disclosure relates to a recording device.

2. Related Art

A recording device that records an image on a medium is known. The recording device is, for example, an inkjet type printer.

In the printer described in JP-A-2007-49512, objects placed on a document cover are prevented from falling into a sheet feeding port by an upright wall section whose tip end is inclined toward a free end side of the document cover. In the printer, an upper end of the upright wall section is configured so as not to interfere with a paper sheet placement plate in a reclining state (refer to JP-A-2007-49512).

However, in the related art, since a tip end of the upright wall section is configured to be inclined toward the free end side of the document cover, the upright wall section cannot be overlapped with the sheet feeding port, and there is room for improvement from the viewpoint of suppressing falling of an object into the sheet feeding port.

SUMMARY

An aspect for solving the above-described problem is a recording device including a placement section configured to pivot about a first pivot shaft between a use state and a stored state, the placement section being configured to support a medium to be recorded on by a recording section in the use state and configured not to support the medium in the stored state; a housing that accommodates the recording section and in which is formed a sheet feeding port through which the medium supported on the placement section passes; a cover section configured to pivot about a second pivot shaft between a covering state that covers at least a part of the sheet feeding port and an open state that opens up the sheet feeding port; and an interlocking section that pivots the cover section from the open state to the covering state when the placement section pivots from the stored state to the use state, and that pivots the cover section from the covering state to the open state when the placement section pivots from the use state to the stored state, wherein the cover section in the open state is in a posture along the placement section in the stored state and the sheet feeding port is between the first pivot shaft and the second pivot shaft.

DESCRIPTION OF EMBODIMENTS

Hereinafter, embodiments will be described with reference to the drawings.

A first embodiment will be described.

An outline of a recording device 1 according to a first embodiment will be described with reference to FIGS. 1 to 6.

Figure 1:
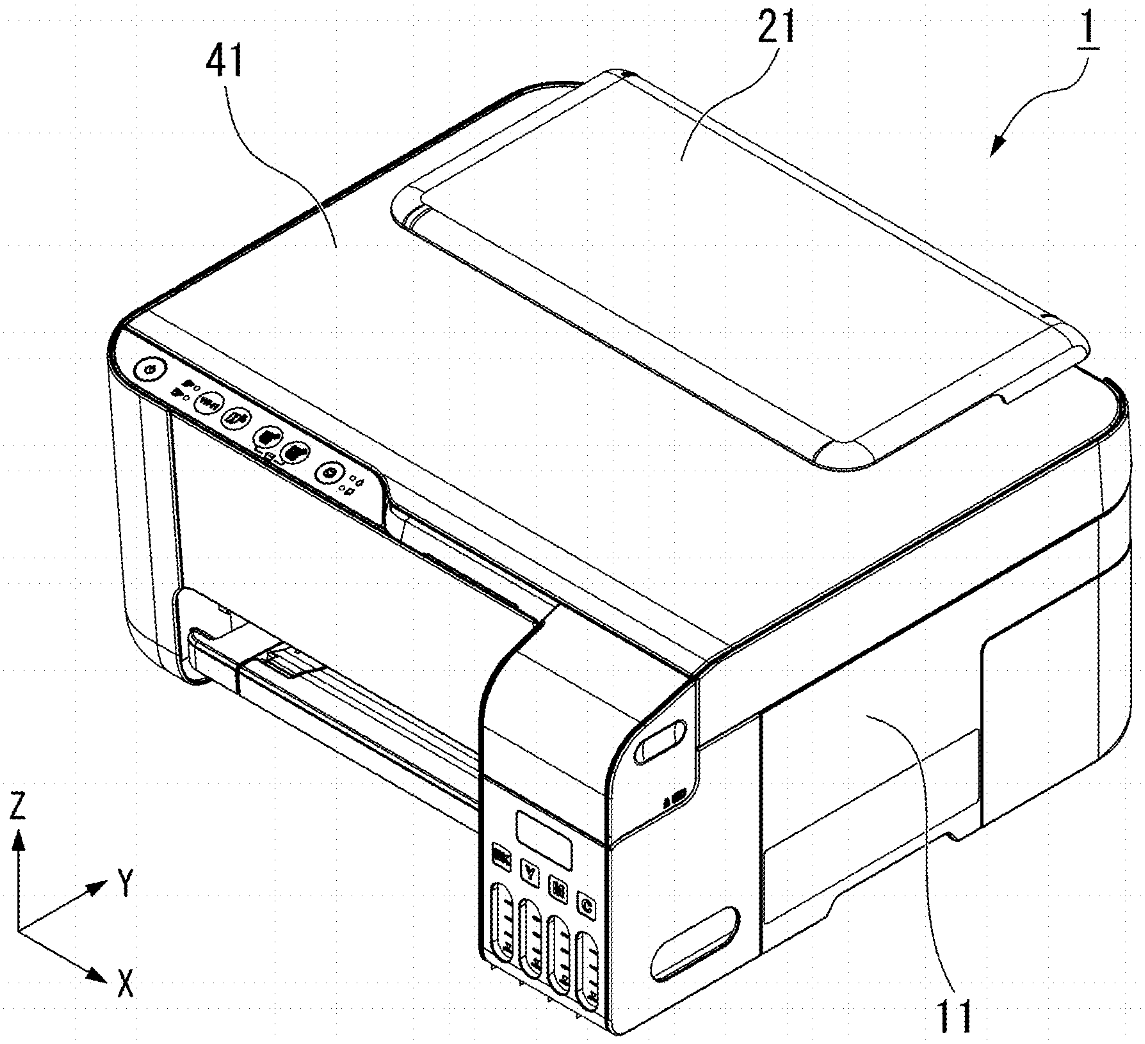
FIG. 1 is an exterior perspective view showing an example of the exterior of a recording device in which a placement section according to a first embodiment is in a stored state.

FIG. 1 is an exterior perspective view showing an example of the exterior of the recording device 1 in which a placement section 21 according to the first embodiment is in a stored state.

In FIG. 1, for convenience of description, X-Y-Z orthogonal coordinate axes, which are three dimensional orthogonal coordinate axes, are shown.

In the present embodiment, a direction parallel to an X-axis corresponds to a left-right direction, which is a width direction of the recording device 1, a direction parallel to a Y-axis corresponds to a front-rear direction, which is a depth direction of the recording device 1, and a direction parallel to a Z-axis corresponds to a vertical direction, which is a height direction of the recording device 1. A positive side of the X-axis is a right direction, a negative side of the X-axis is a left direction, a positive side of the Y-axis is a rear direction, a negative side of the Y-axis is a front direction, a positive side of the Z-axis is an upper direction, and a negative side of the Z-axis is a lower direction.

In the present embodiment, a surface of the recording device 1 on a negative side of the Y-axis is referred to as a front surface. Additionally, a surface of the recording device 1 on a positive side of the Y-axis may be referred to as a rear surface. Note that a positive side of the Y-axis is also referred to as a rear side.

In the present embodiment, the recording device 1 is an inkjet printer including a scanner which reads a document supported on a placement section. Such a recording device 1 may be referred to as a multifunction device.

Note that in addition to the above-described scanner or instead of the above-described scanner, the recording device 1 may include an automatic document transport type scanner that reads a document while transporting the document. The recording device 1 may be a printer that is not provided with a scanner.

Here, the printer is not necessarily limited to an inkjet printer, and a laser printer may be used.

In the present embodiment, the medium to be printed is paper, which may also be referred to as a paper sheet. Note that a medium to be printed is not necessarily paper. for example, an auxiliary tray may be used, and a compact disc recordable (CD-R) may be used as the medium.

Note that in the present embodiment, a detailed description of a scanner is omitted.

Figure 2:
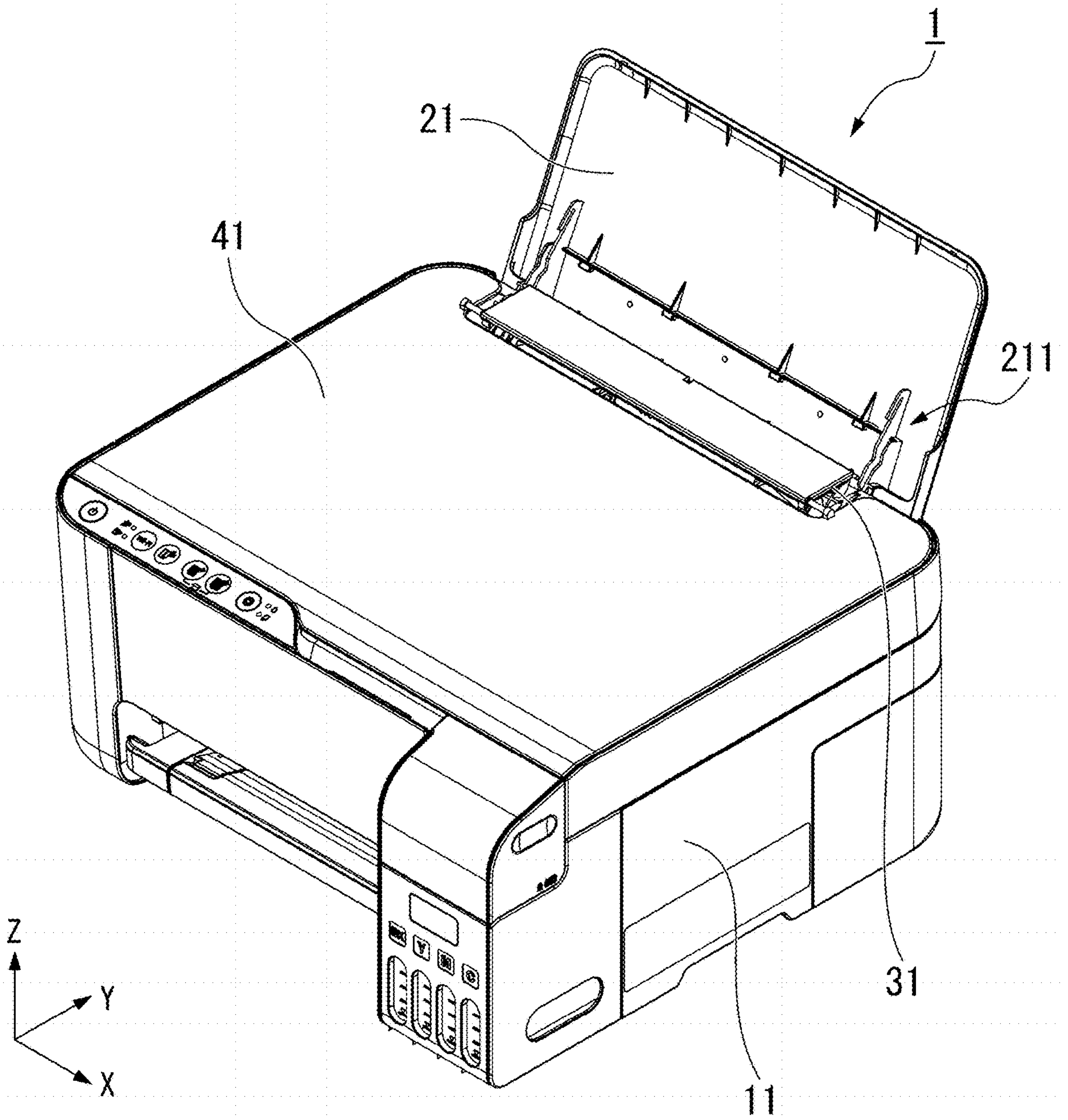
FIG. 2 is an exterior perspective view showing an example of the exterior of the recording device in which the placement section according to the first embodiment is in a use state.

FIG. 2 is an exterior perspective view showing an example of the exterior of the recording device 1 in which the placement section 21 according to the first embodiment is in a use state.

Figure 3:
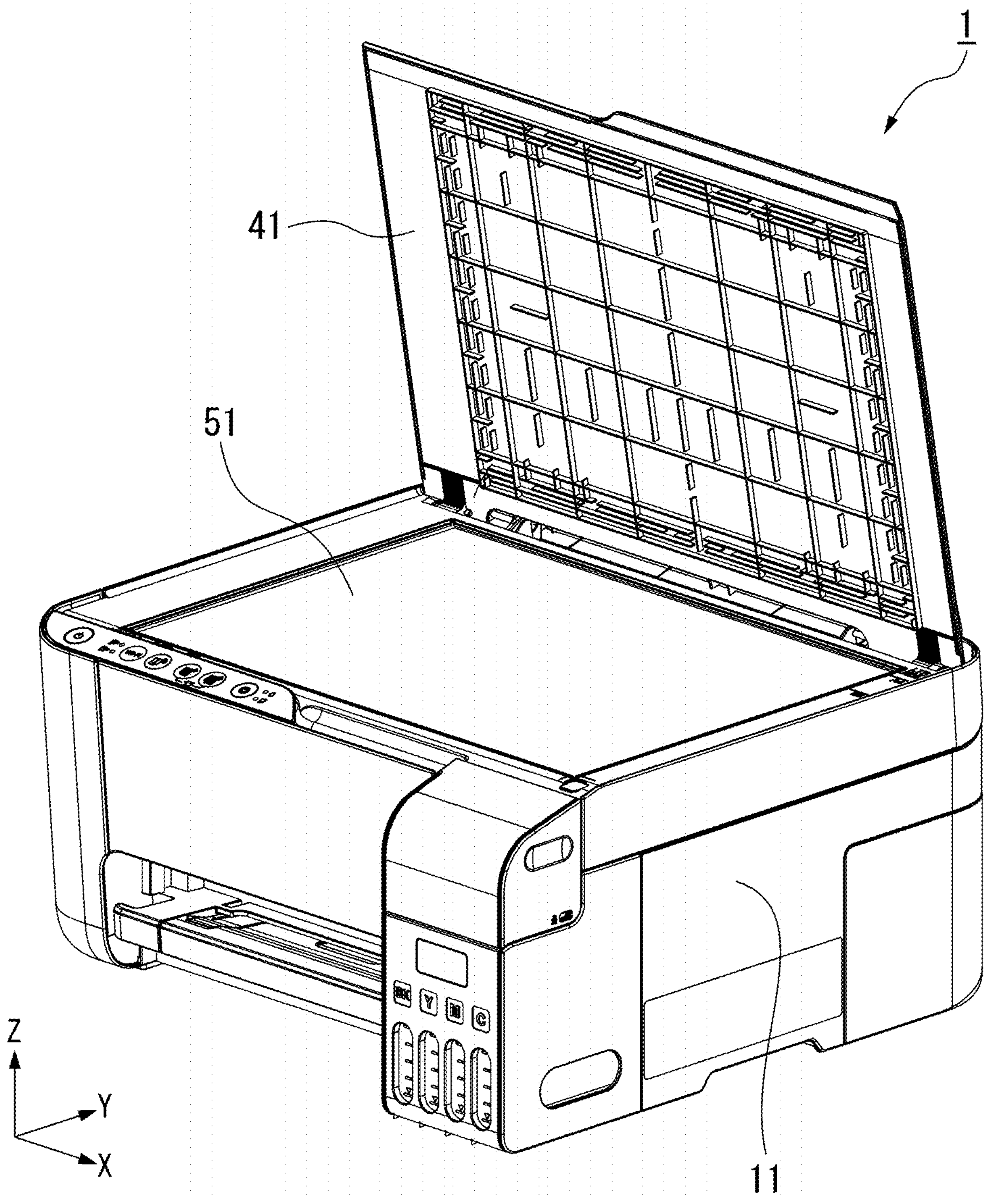
FIG. 3 is an exterior perspective view showing an example of the exterior of the recording device in which an upper cover according to the first embodiment is in an open state.

FIG. 3 is an exterior perspective view showing an example of the exterior of the recording device 1 in which an upper cover 41 according to the first embodiment is in an open state.

Each of FIGS. 2 and 3 shows X-Y-Z orthogonal coordinate axes similar to those of FIG. 1.

Figure 4:
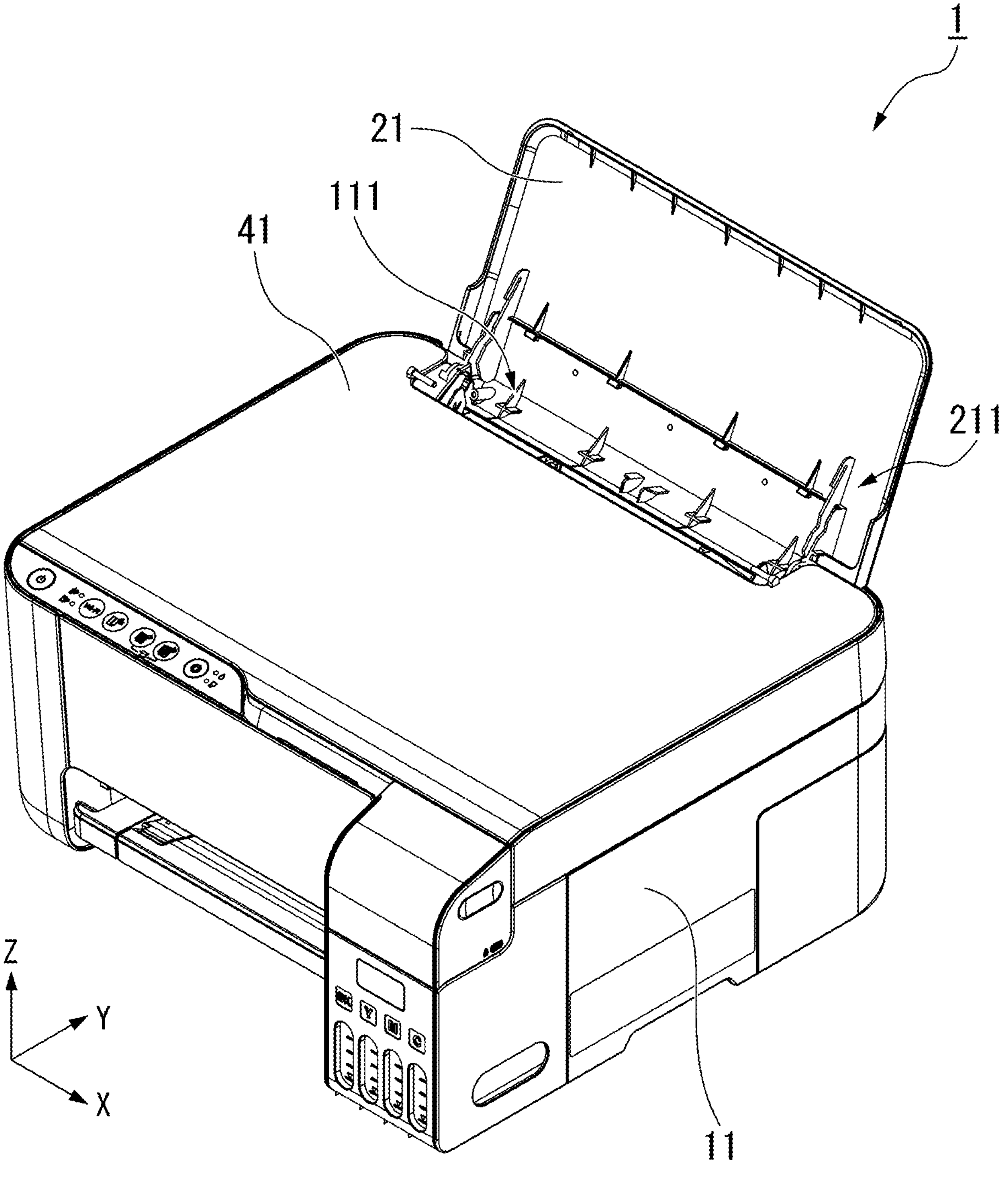
FIG. 4 is a view showing an example of the exterior of the recording device in which the placement section according to the first embodiment is in the use state and a cover section is excluded.
Figure 5:
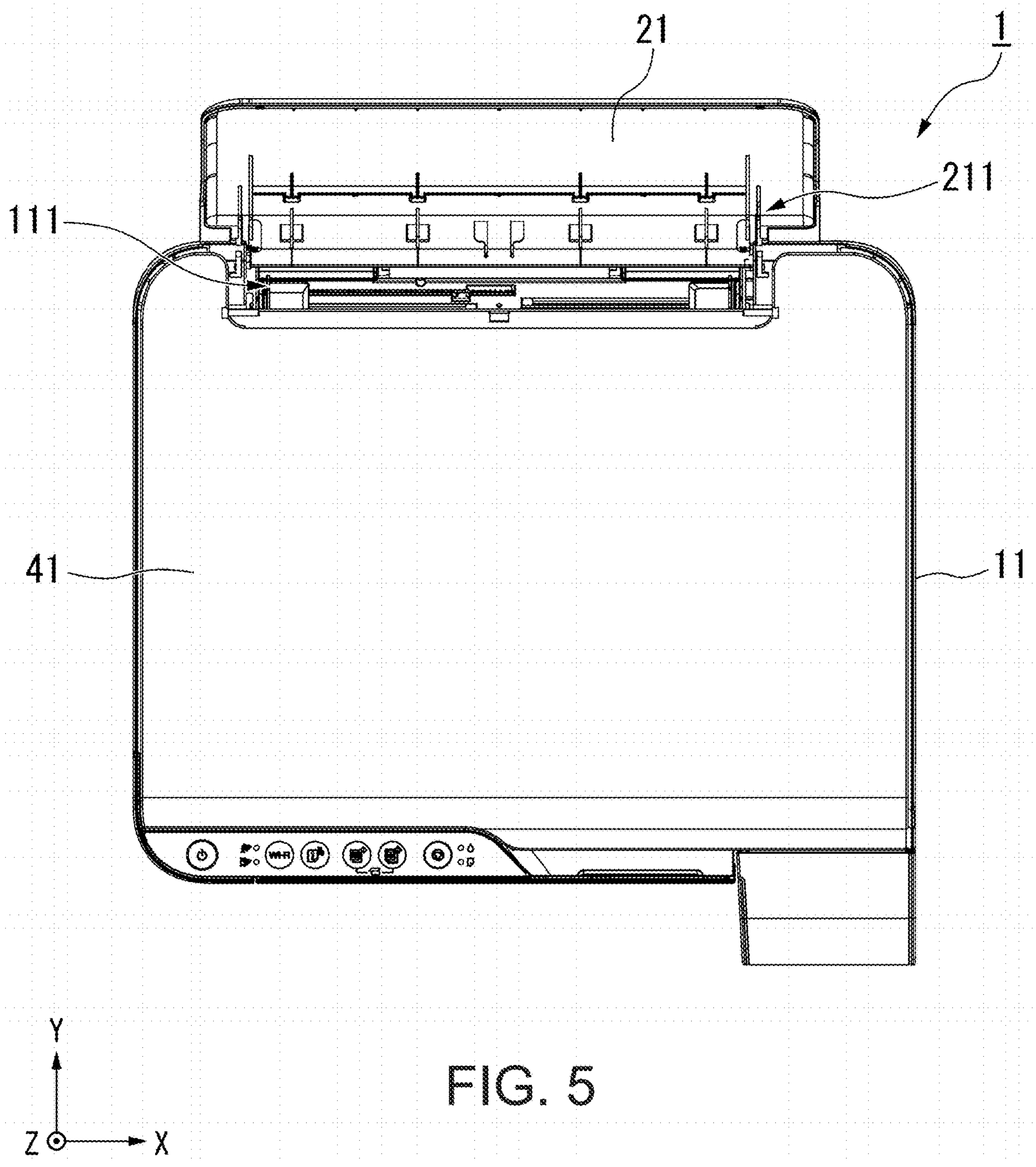
FIG. 5 is a view showing an example of the exterior of the recording device in which the placement section according to the first embodiment is in the use state and the cover section is excluded.

FIGS. 4 and 5 are views showing an example of the exterior of the recording device 1 in which the placement section 21 according to the first embodiment is in the use state and a cover section 31 has been removed. Here, FIG. 4 and FIG. 5 are shown from different viewpoints.

Each of FIGS. 4 and 5 shows X-Y-Z orthogonal coordinate axes similar to those of FIG. 1.

Note that in FIGS. 4 and 5, for convenience of description, the cover section 31 is not shown in order to make a sheet feeding port 111 easier to see.

The recording device 1 includes a housing 11, the placement section 21, the cover section 31, the upper cover 41, and a reading unit 51.

Note that the placement section 21 may also be referred to as a paper sheet placement plate or a paper support. The cover section 31 may be referred to a upright wall section, an auto sheet feeder (ASF) cover, or the like. The upper cover 41 may be referred to a document cover or the like. The reading unit 51 may be referred to as a scanner or the like.

Figure 6:
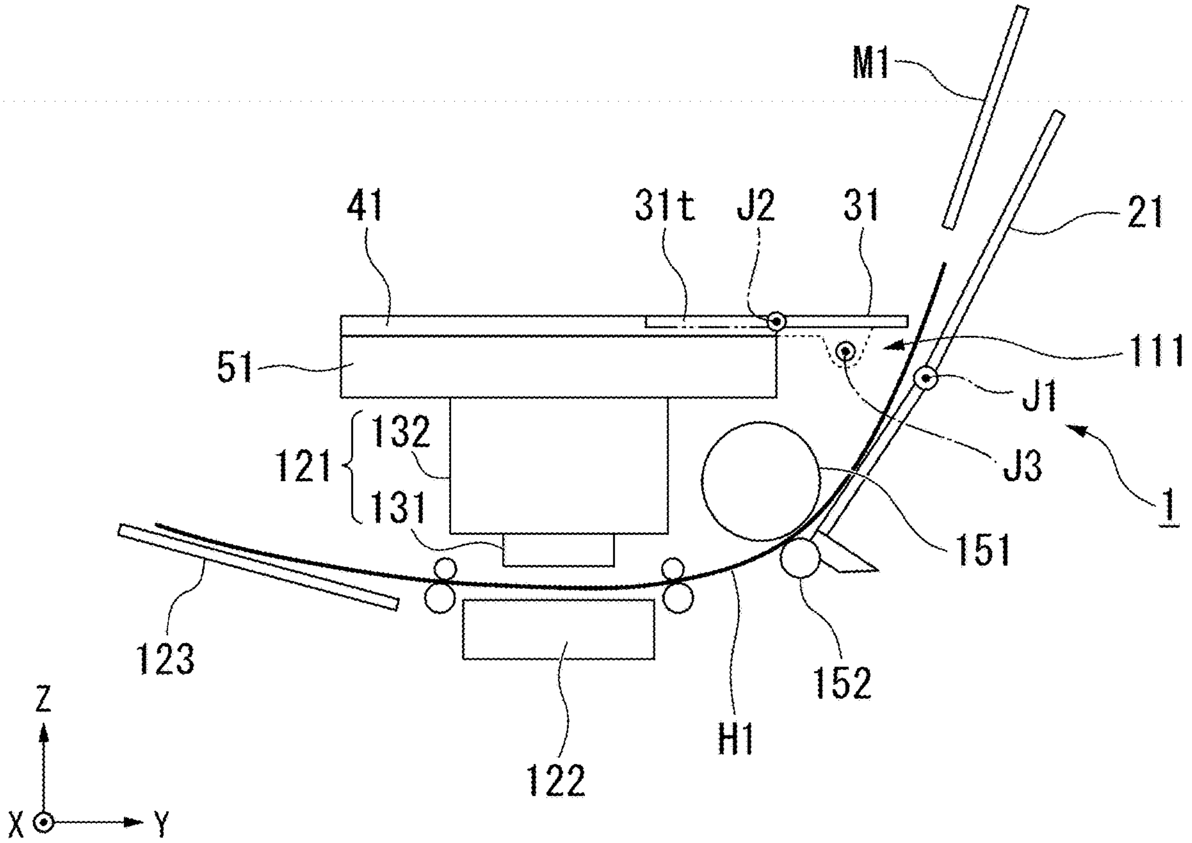
FIG. 6 is a diagram showing an example of a schematic configuration of the inside of the recording device according to the first embodiment.

FIG. 6 is a diagram showing an example of a schematic configuration of the inside of the recording device 1 according to the first embodiment. In FIG. 6, X-Y-Z orthogonal coordinate axes similar to those in FIG. 1 is shown.

In the example of FIG. 6, the cross section of the recording device 1 viewed from a right side to a left side is schematically shown.

In the example of FIG. 6, the components of the recording device 1 include the placement section 21, a first pivot shaft J1, which is a pivot shaft of the placement section 21, the cover section 31, a second pivot shaft J2, which is a pivot shaft of the cover section 31, the upper cover 41, a third pivot shaft J3, which is a pivot shaft of the upper cover 41, a recording section 121 including a head 131 and a carriage 132, a platen 122, a sheet discharge tray 123, and various roller sections.

Here, in the example of FIG. 6, a schematic configuration example indicating that the upper cover 41 includes the third pivot shaft J3 is shown using a dotted line, but this is shown for convenience of description, and is not necessarily a strict shape. This dotted line schematically represents a part of the upper cover 41.

In the example of FIG. 6, the cover section 31 in a covering state is shown, and for convenience of description, the cover section 31 in an open state is virtually indicated by a two dot chain line as a t-th cover section 31*t*. Here, the covering state and the open state will be described later. Note that the t-th cover section 31*t* extends horizontally, but overlaps the upper cover 41 when viewed in the left-right direction, may not necessarily be such a configuration. For example, the t-th cover section 31*t* may be configured to be supported on the upper cover 41 in a posture inclined with respect to the horizontal direction.

In the example of FIG. 6, a medium M1 supported on the placement section 21 and a transport path H1 of the medium M1 are shown. Note that in the present embodiment, the medium M1 is, for example, a paper sheet.

Here, as a roller section, for example, a sheet feed roller 151, a separation roller 152, and the like are shown.

Note that in addition to the transport path H1, a transport path for transporting the medium M1 from a sheet feeding cassette (not shown) that can accommodate the medium M1 may be provided.

An outline of a printing operation in the recording device 1 will be described.

The medium M1 supported on the placement section 21 is taken into the recording device 1 by the sheet feed roller 151 and transported to a recording position by the recording section 121. Then, printing is performed on the medium M1 by the recording section 121, and thereafter, the medium M1 after printing is discharged to the sheet discharge tray 123 by the roller.

Here, the recording position by the recording section 121 is a position between the head 131 and the platen 122. Recording by the recording section 121 is performed by writing by the head 131. The carriage 132 moves the head 131 in the left-right direction perpendicular to a transport direction of the medium M1.

However, not only a configuration in which recording is performed over the left-right direction of the medium M1 by moving the head 131, but also a configuration in which the head 131 is provided over the left-right direction of the medium M1 and recording is performed without moving the head 131 may be adopted.

An outline of a reading operation in the recording device 1 will be described.

The upper cover 41 is opened, and a document on which an image to be read is recorded is supported on an upper surface of the reading unit 51. Then, the image is read by the reading unit 51. Note that the document is supported such that a surface on which the image is recorded is in contact with an upper surface of the reading unit 51.

As described above, an upper surface of the reading unit 51 serves as a document placement surface on which a document to be read is supported. The upper cover 41, which covers the document placement surface, includes a third pivot shaft J3, which serves as a rotation fulcrum, at a rear side of the recording device 1.

When setting a document on the document placement surface, a user opens the upper cover 41 with the third pivot shaft J3 as a rotation center. A feeding mechanism including the sheet feed roller 151 or the like is arranged near the third pivot shaft J3 of the upper cover 41. For this reason, if the cover section 31 is not provided, by opening the upper cover 41 when a user has placed an object on the upper cover 41, the object may fall into an opening section, which is a paper sheet placement section of the feeding mechanism, and cause a sheet feeding failure, and when the object is a metal object such as a clip, there is a possibility that the object cause a short circuit by falling into the opening section. Note that the opening section corresponds to the sheet feeding port 111.

Therefore, in the present embodiment, the cover section 31 is provided in the recording device 1 to prevent a falling object from entering the sheet feeding port 111. Note that the cover section 31 has a width that covers at least a part of the sheet feeding port 111 for paper sheet placement, and as an example, has a width equal to or larger than the sheet feeding port 111.

The cover section 31 includes the second pivot shaft J2 as a rotation fulcrum, and when the placement section 21 is stored substantially parallel to an upper side of the upper cover 41, the cover section 31 moves in an interlocking manner with the placement section 21 and is stored in the upper surface of the upper cover 41. When the placement section 21 is opened up to be in a use position, the cover section 31 pivots in an interlocking manner with the placement section 21 to be in a position of covering a part or the whole of the sheet feeding port 111.

Here, the placement section 21 is pivotable about the first pivot shaft J1 as a rotation fulcrum into a use state, as shown in FIG. 2 and the like, capable of supporting the medium M1 recorded by the recording section 121 and into a stored state, as shown in FIG. 1 and the like, in which the medium M1 cannot be supported.

The housing 11 accommodates the recording section 121, and forms a sheet feeding port 111 through which the medium M1 supported on the placement section 21 can pass.

The cover section 31 is pivotable about the second pivot shaft J2 into a covering state, as shown in FIG. 2, that covers at least a part of the sheet feeding port 111 and the like, and an open state that opens the sheet feeding port 111.

Here, the recording device 1 may include, for example, a biasing section (not shown) that biases the cover section 31 into the covering state. The biasing section may be, for example, a spring.

The upper cover 41 is pivotable with respect to the housing 11 about the third pivot shaft J3.

The third pivot shaft J3 is located at an end section of the upper cover 41. The end section is located between the cover section 31 in the open state and the placement section 21 in the use state.

The cover section 31 is provided pivotable with respect to the upper cover 41.

The reading unit 51 reads a document.

The upper cover 41 is pivotable with respect to the reading unit 51 about the third pivot shaft J3.

The placement section 21 is provided pivotable with respect to the housing 11.

The first pivot shaft J1 is located below the second pivot shaft J2.

Here, the first pivot shaft J1 and the second pivot shaft J2 may not necessarily be arranged at positions facing each other in the vertical direction, and may be arranged at positions facing each other in a direction oblique to the vertical direction, for example.

With reference to FIGS. 7 to 17, an example of a first interlocking section 211, which is a mechanism for interlocking the placement section 21 and the cover section 31, will be described.

Here, in the present embodiment, the placement section 21, the cover section 31, and the upper cover 41 are generally symmetrical with respect to the width direction of the recording device 1 when viewed from a center line perpendicular to the width direction.

For this reason, in the present embodiment, the configuration on a right side of the placement section 21, the cover section 31, and the upper cover 41 will be described as an example, but the configuration on a left side is also bilaterally symmetrical and similar.

Figure 7:
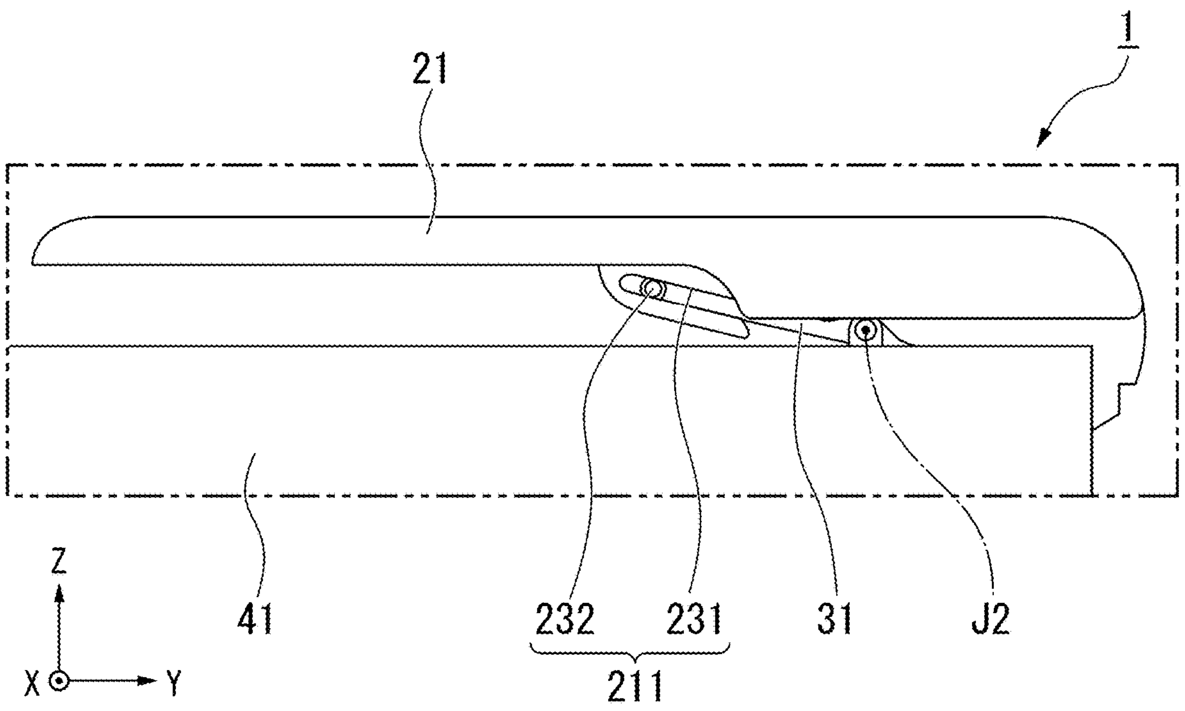
FIG. 7 is a view showing an example of a state in which the placement section is in the stored state and the cover section is in an open state in the recording device according to the first embodiment.

FIG. 7 is a view showing an example of a state in which the placement section 21 is in the stored state and the cover section 31 is in the open state in the recording device 1 according to the first embodiment.

Figure 8:
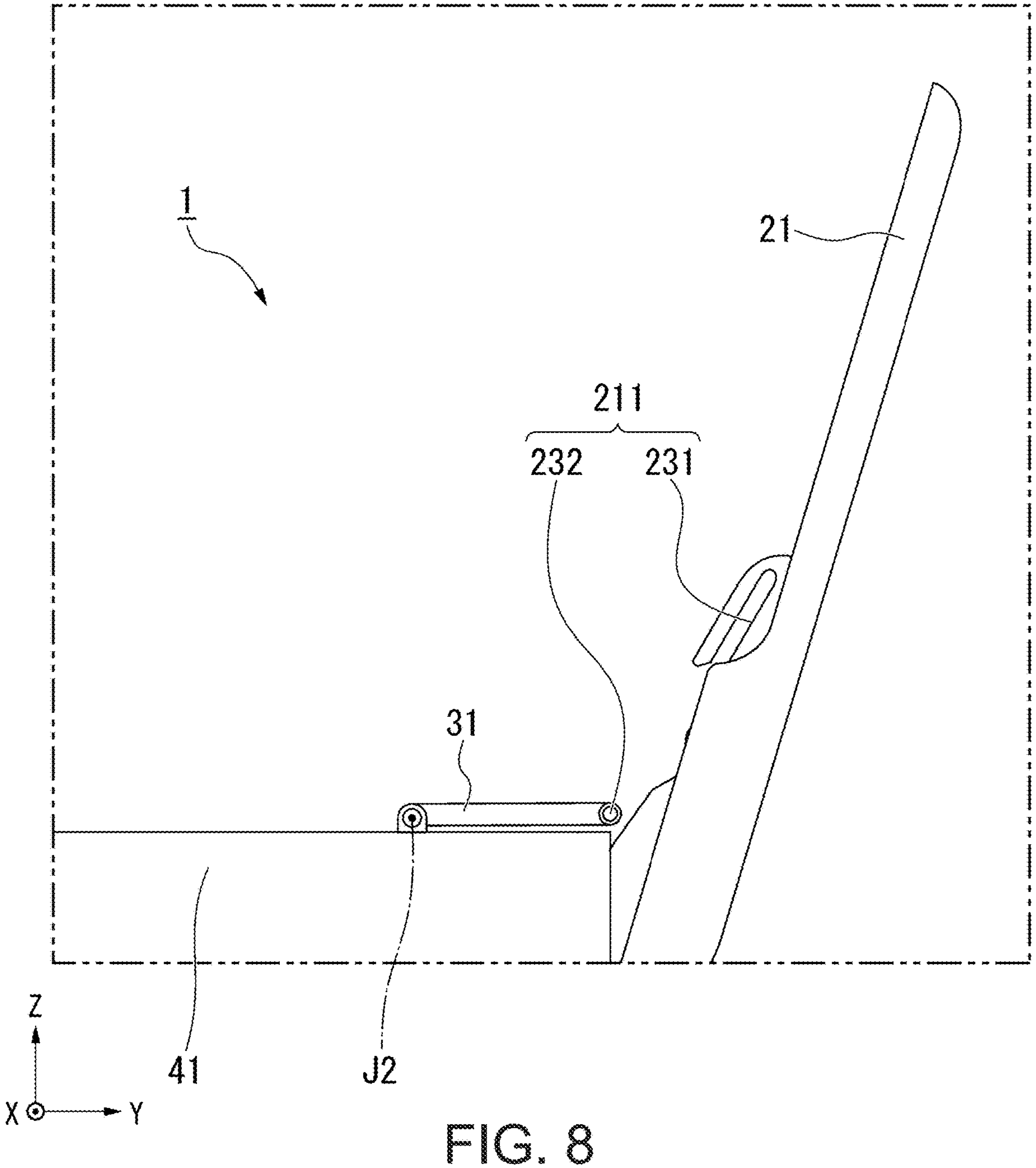
FIG. 8 is a view showing an example of a state in which the placement section is in the use state and the cover section is in a covering state in the recording device according to the first embodiment.

FIG. 8 is a view showing an example of a state in which the placement section 21 is in the use state and the cover section 31 is in the covering state in the recording device 1 according to the first embodiment.

Figure 9:
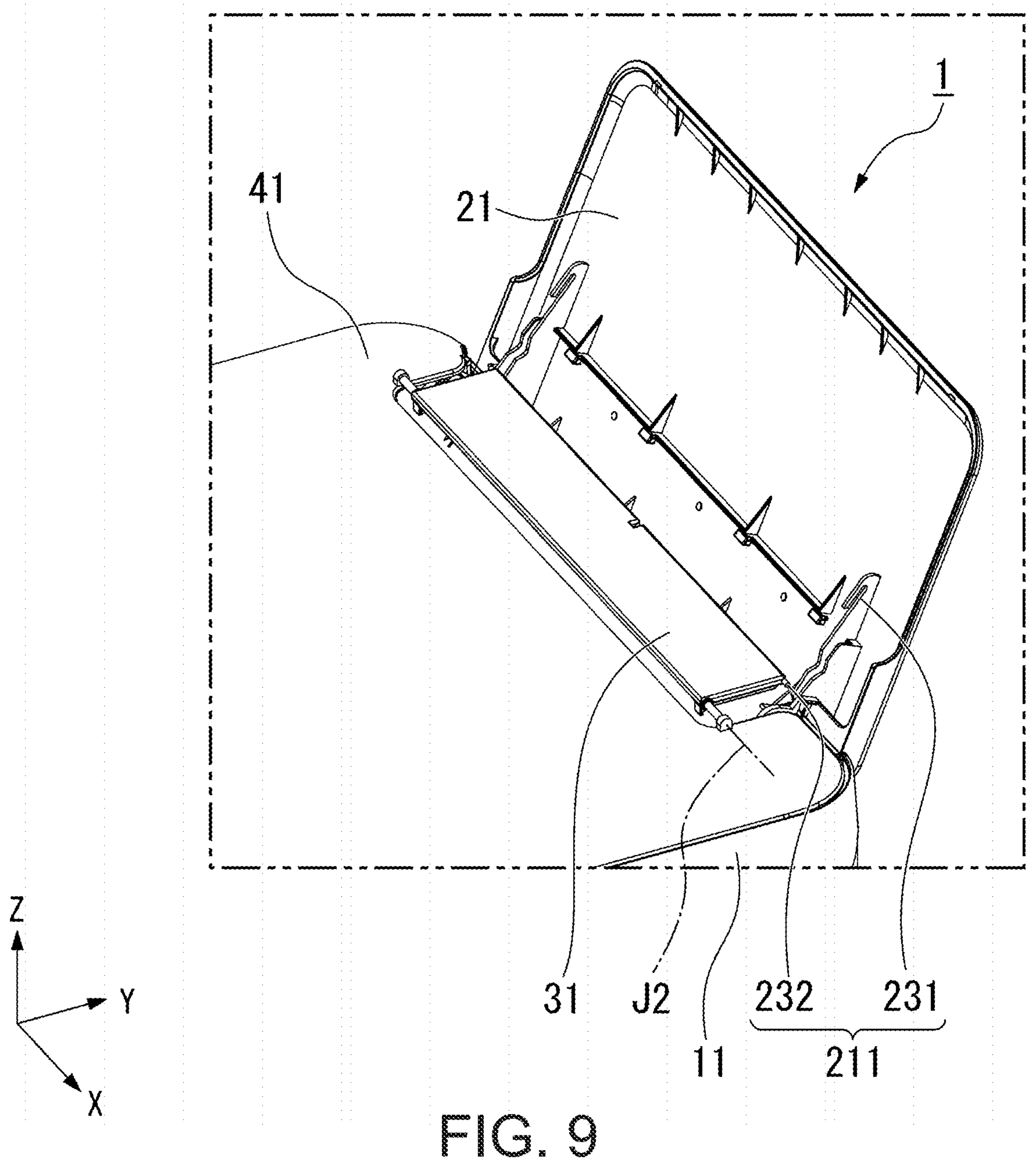
FIG. 9 is a view showing an example of a state in which the placement section is in the use state and the cover section is in the covering state in the recording device according to the first embodiment.

FIG. 9 is a view showing an example of a state in which the placement section 21 is in the use state and the cover section 31 is in the covering state in the recording device 1 according to the first embodiment.

Each of FIGS. 7 to 9 shows X-Y-Z orthogonal coordinate axes similar to those of FIG. 1.

The example of FIG. 9 is different from the example of FIG. 8 in the angle of the viewpoint shown in the drawing.

Note that in FIGS. 7 to 9, a state in the vicinity of the placement section 21 and the cover section 31 is shown, and other constituent sections are not shown.

Figure 10:
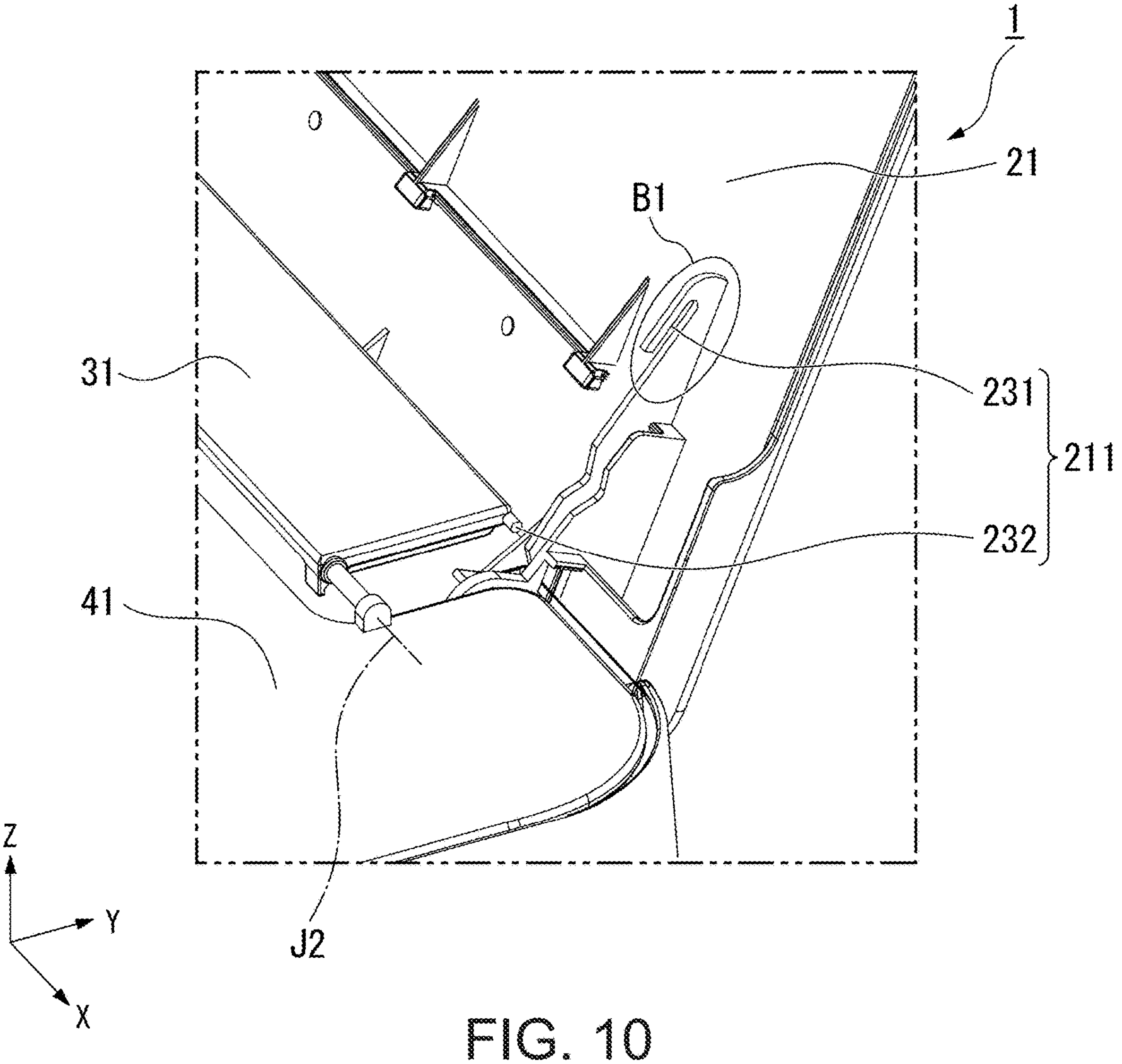
FIG. 10 is a view showing an example of a state of a first interlocking section in a case where the placement section is in the use state and the cover section is in the covering state in the recording device according to the first embodiment.

FIG. 10 is a view showing an example of a state of the first interlocking section 211 in a case where the placement section 21 is in the use state and the cover section 31 is in the covering state in the recording device 1 according to the first embodiment.

FIG. 10 shows X-Y-Z orthogonal coordinate axes similar to those in FIG. 1.

The example of FIG. 10 is a partially enlarged view of the example of FIG. 9.

Note that FIG. 10 shows a first portion B1, which will be described later.

The recording device 1 includes the first interlocking section 211 including a first rail section 231 and a protrusion 232.

Note that the first rail section 231 is an example of a guide section, and may be referred to as, for example, a groove section.

The protrusion 232 is an example of a guided section, and may be referred to as a protruding section, for example. The protrusion 232 has, for example, a cylindrical protruding shape, but may have other shapes.

The first interlocking section 211 pivots the cover section 31 from the open state to the covering state when the placement section 21 pivots from the stored state to the use state, and pivots the cover section 31 from the covering state to the open state when the placement section 21 pivots from the use state to the stored state.

The cover section 31 in the open state is in a posture along the placement section 21 in the stored state.

The sheet feeding port 111 is located between the first pivot shaft J1 and the second pivot shaft J2.

In the present embodiment, when the placement section 21 pivots from the use state to the stored state, the part of the section 21 that constitutes the first interlocking section 211 collides with the vicinity of a tip end of the cover section 31, which extends from the second pivot shaft J2, and applies force for pivoting the cover section 31 from the covering state to the open state to the cover section 31.

Here, as an aspect in which the cover section 31 in the open state is in a posture along the placement section 21 in the stored state, the posture is not necessarily parallel to the placement section 21, and for example, the posture may be in an oblique direction with respect to the placement section 21.

In the present embodiment, in the first interlocking section 211, the protrusion 232, which is an example of a guided section, is provided on the cover section 31. That is, in the present embodiment, the guided section is the protrusion 232 provided on the cover section 31.

In the present embodiment, in the first interlocking section 211, the first rail section 231, which is an example of a guide section, is provided on the placement section 21 and guides the protrusion 232. That is, in the present embodiment, the guide section is the first rail section 231 which is provided in the placement section 21 and guides the protrusion 232.

Here, in the present embodiment, the protrusion 232 is provided at a tip end of the cover section 31 in a direction extending from the second pivot shaft J2, and is provided at a position of the tip end so as to project in a direction outward in the width direction of the recording device 1.

The first rail section 231 is arranged outside the cover section 31 in the width direction of the recording device 1. The first rail section 231 includes a rail-shaped portion extending to an opposite side from a tip end in a direction extending from the first pivot shaft J1 of the placement section 21. The portion may be referred to as a groove or the like.

In the present embodiment, the protrusion 232 is configured to be detachably fitted to the rail-shaped portion of the first rail section 231.

Note that as another configuration example, a guided section provided on the placement section 21 and a guide section provided on the cover section 31 may be used.

That is, the first interlocking section 211 includes a guided section provided on one of the placement section 21 and the cover section 31, and a guide section that is provided on the other of the placement section 21 and the cover section 31 and that is configured to guide the guided section.

With reference to FIGS. 11 to 17, an example of an interlocking operation of the first interlocking section 211 is shown.

Figure 11:
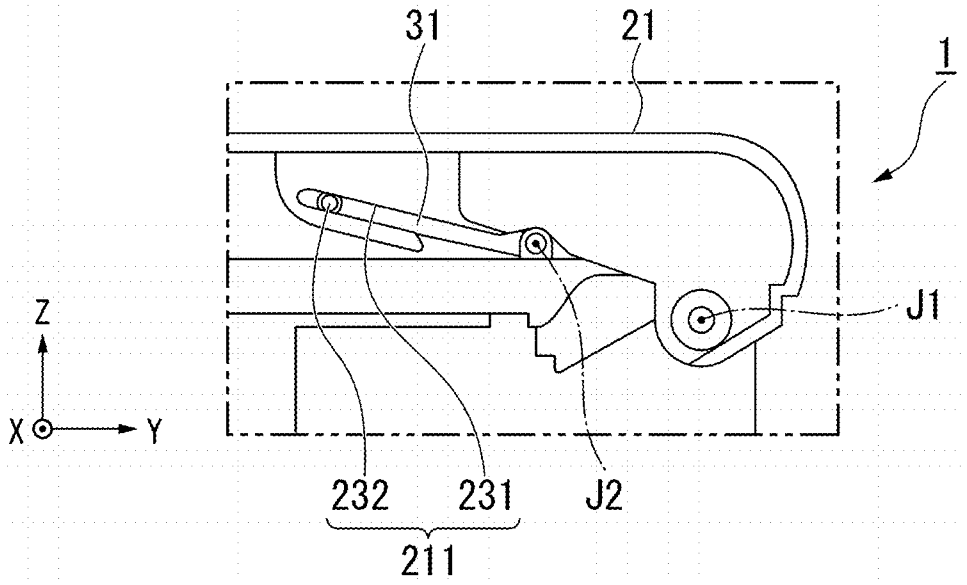
FIG. 11 is a view showing an example of a state of the first interlocking section in a case where the placement section is in the stored state and the cover section is in the open state in the recording device according to the first embodiment.

FIG. 11 is a view showing an example of a state of the first interlocking section 211 in a case where the placement section 21 is in the stored state and the cover section 31 is in the open state in the recording device 1 according to the first embodiment. This state is referred to as a placement section stored state. Note that this state may be referred to as a cover section open state.

Figure 12:
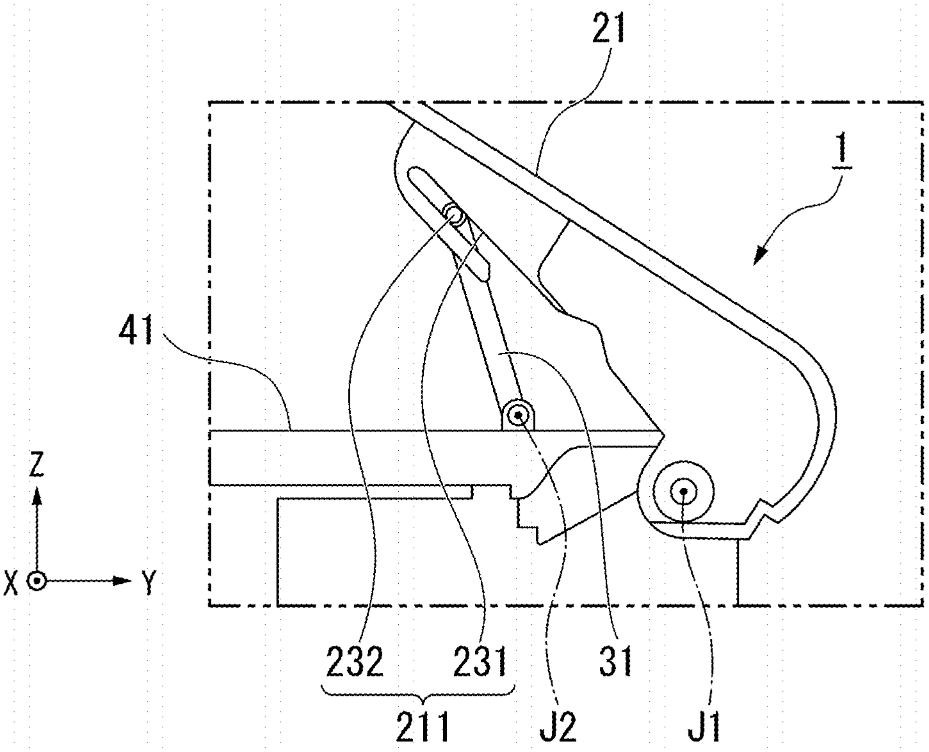
FIG. 12 is a view showing an example of a state of the first interlocking section in a case where the placement section is in the middle of transition from the stored state to the use state in the recording device according to the first embodiment.

FIG. 12 is a view showing an example of a state of the first interlocking section 211 in a case where the placement section 21 is in the middle of transition from the stored state to the use state in the recording device 1 according to the first embodiment. This state is referred to as a first transition state.

Figure 13:
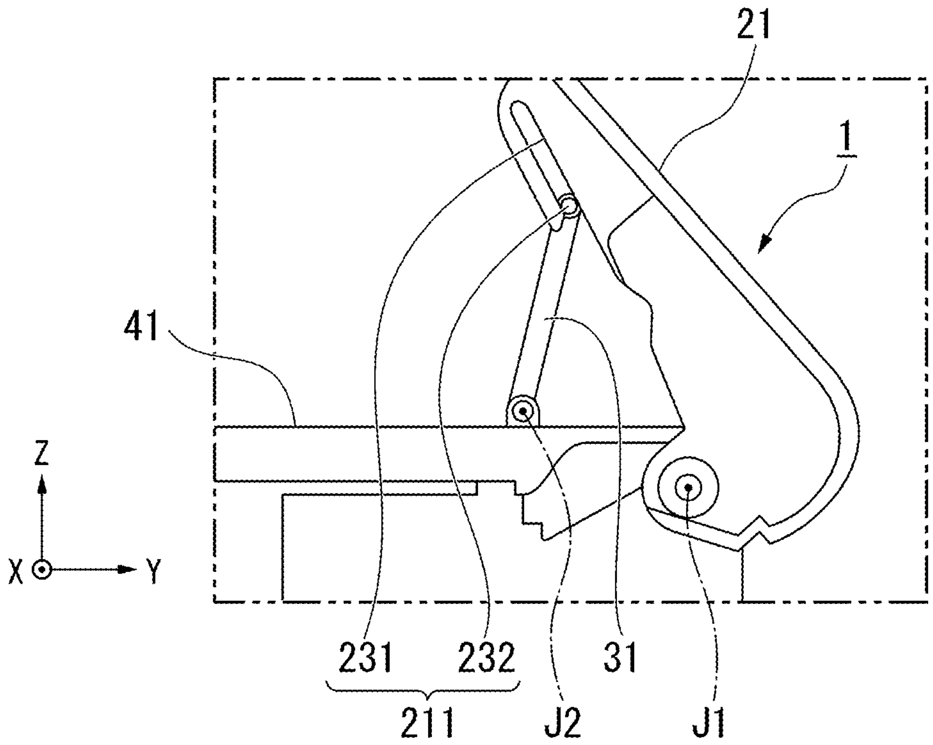
FIG. 13 is a view showing an example of a state of the first interlocking section in a case where the placement section is in the middle of transition from the stored state to the use state in the recording device according to the first embodiment.
Figure 14:
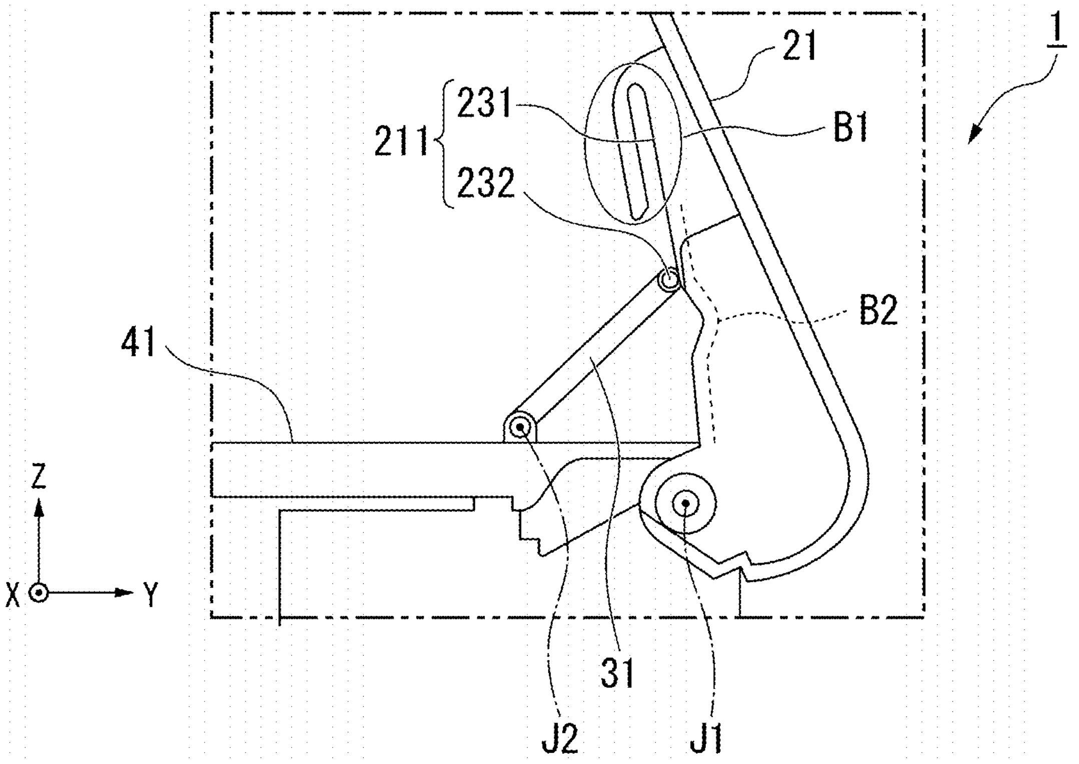
FIG. 14 is a view showing an example of a state of the first interlocking section in a case where the placement section is in the middle of transition from the stored state to the use state in the recording device according to the first embodiment.

FIG. 13 is a view showing an example of a state of the first interlocking section 211 in a case where the placement section 21 is in the middle of transition from the stored state to the use state in the recording device 1 according to the first embodiment. This state is referred to as a second transition state. FIG. 14 is a view showing an example of a state of the first interlocking section 211 in a case where the placement section 21 is in the middle of transition from the stored state to the use state in the recording device 1 according to the first embodiment. This state is referred to as a third transition state.

Figure 15:
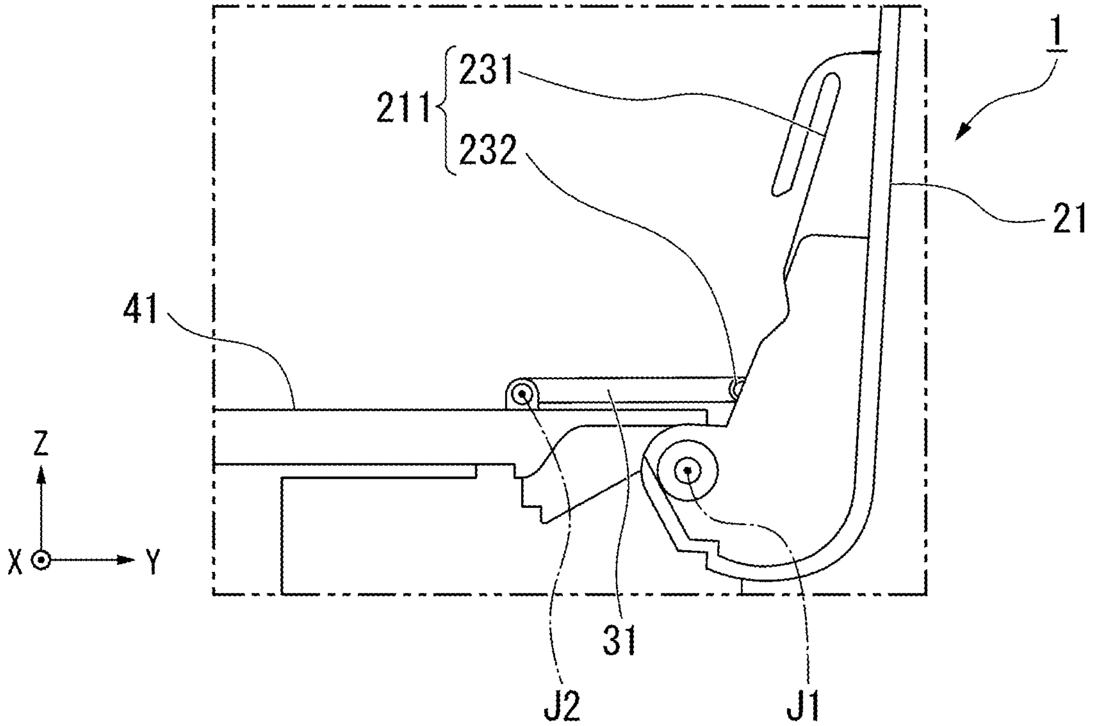
FIG. 15 is a view showing an example of a state of the first interlocking section in a case where the placement section is in the middle of transition from the stored state to the use state in the recording device according to the first embodiment.

FIG. 15 is a view showing an example of a state of the first interlocking section 211 in a case where the placement section 21 is in the middle of transition from the stored state to the use state in the recording device 1 according to the first embodiment. This state is referred to as a fourth transition state.

Figure 16:
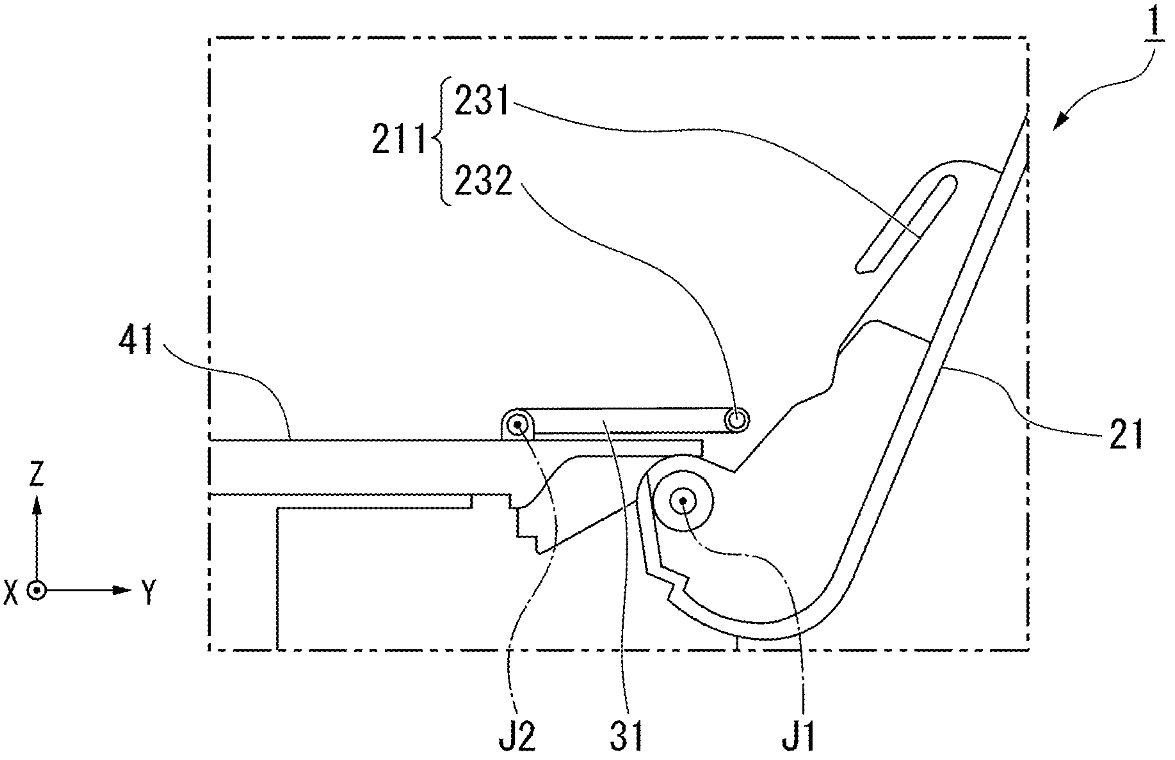
FIG. 16 is a view showing an example of a state of a first interlocking section in a case where the placement section is in the use state and the cover section is in the covering state in the recording device according to the first embodiment.

FIG. 16 is a view showing an example of a state of the first interlocking section 211 in a case where the placement section 21 is in the use state and the cover section 31 is in the covering state in the recording device 1 according to the first embodiment. This state is referred to as a placement section use state. Note that this state may be referred to as a cover section covering state.

FIGS. 11 to 16 show X-Y-Z orthogonal coordinate axes similar to those of FIG. 1.

In FIGS. 11 to 16, a schematic cross-section of the vicinity of the first interlocking section 211 is shown from a viewpoint of viewing a left side from a right side of the recording device 1.

Figure 17:
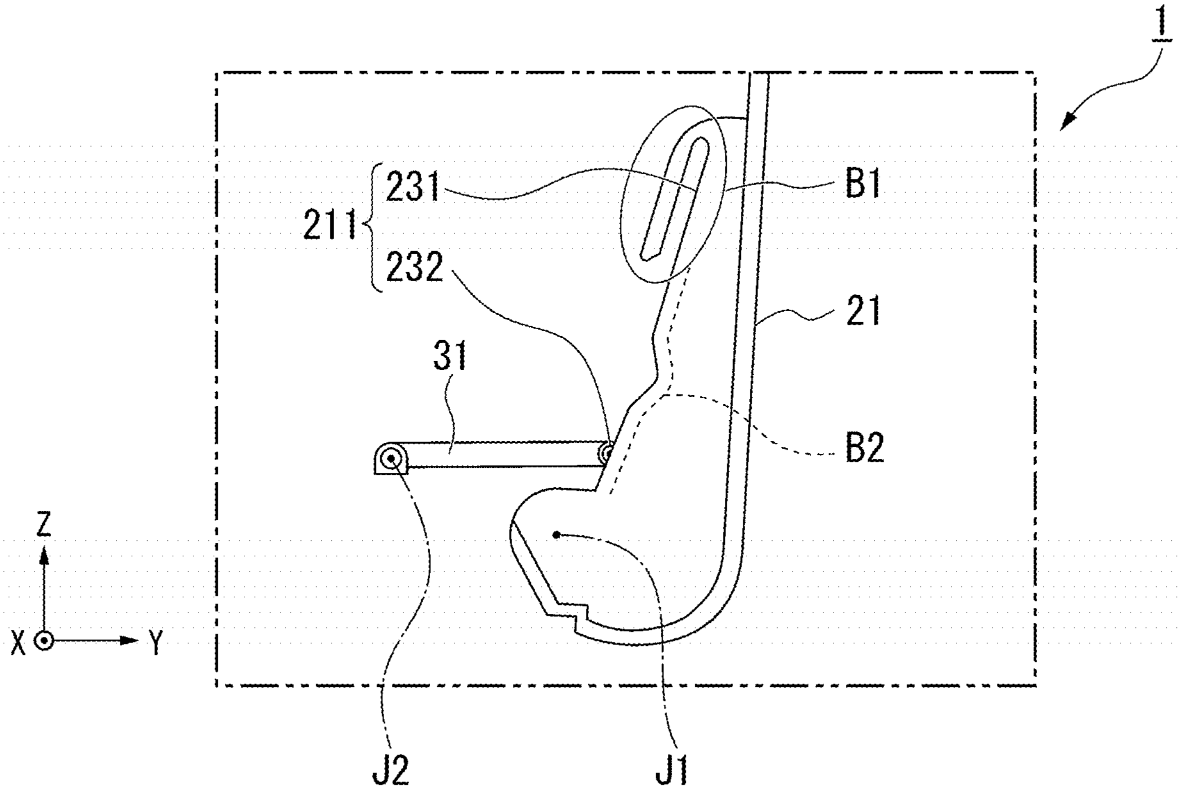
FIG. 17 is a view showing an example of a first portion and a second portion relating to the first interlocking section in the recording device according to the first embodiment.

FIG. 17 is a view showing an example of the first portion B1 and a second portion B2 relating to the first interlocking section 211 in the recording device 1 according to the first embodiment.

FIG. 17 shows X-Y-Z orthogonal coordinate axes similar to those of FIG. 1.

FIG. 17 shows a state in the vicinity of the first interlocking section 211 in the fourth transition state shown in FIG. 15.

In the present embodiment, the first rail section 231 includes the first portion B1 having an elongated groove shape provided in the placement section 21 and the second portion B2 having a predetermined curved shape provided in the placement section 21 so as to be connected to the first portion B1. Here, the first portion B1 is a rail-shaped portion extending from a tip end with respect to a direction in which the placement section 21 extends from the first pivot shaft J1 to the opposite side. Note that the second portion B2 may have an inclined surface shape, for example.

FIG. 17 shows the first portion B1, which represents the range that the protrusion 232 follows when in the groove of the first rail section 231, and the second portion B2, which represents the range that the protrusion 232 follows after separating from the groove of the first rail section 231.

The first portion B1 is constituted by a portion of a rail-shaped groove of the first rail section 231.

The second portion B2 is located outside the rail-shaped groove of the first rail section 231 and is constituted by a portion that comes into contact with the protrusion 232.

Note that among FIGS. 11 to 17, FIGS. 14 and 17 show the first portion B1 and the second portion B2 and FIGS. 11 to 13 and FIGS. 15 and 16 do not show the first portion B1 and the second portion B2.

In the present embodiment, the first interlocking section 211 transitions from the placement section stored state shown in FIG. 11 to the placement section use state shown in FIG. 16 via the first transition state, the second transition state, the third transition state, and the fourth transition state in this order.

In the placement section stored state shown in FIG. 11, the protrusion 232 of the first interlocking section 211 is located in the vicinity of a tip end of the first rail section 231. The tip end represents a tip end in a direction in which the placement section 21 extends from the first pivot shaft J1 of the placement section 21.

In the present embodiment, the tip end of the first rail section 231 is closed, and the side opposite from the tip end is open.

In this state, a direction in which the cover section 31 extends from the second pivot shaft J2 is, with respect to the front-rear direction of the recording device 1, a front surface direction of the recording device 1 with respect to the second pivot shaft J2.

In the first transition state shown in FIG. 12, the placement section 21 starts to open about the first pivot shaft J1 toward the use state. In this state, in the first interlocking section 211, the protrusion 232 is moving slightly toward the side opposite from the tip end of the first rail section 231. In this state, a direction in which the cover section 31 extends from the second pivot shaft J2 is in the front surface direction of the recording device 1 with respect to the second pivot shaft J2 and is near the upper direction.

In this way, as the placement section 21 is open, the protrusion 232 moves in the rail-shaped groove of the first rail section 231, and the cover section 31 rises.

In the second transition state shown in FIG. 13, the placement section 21 is further open toward the use state about the first pivot shaft J1. In this state, in the first interlocking section 211, the protrusion 232 is located in the vicinity of an open end of an elongated groove on the opposite side from a tip end of the first rail section 231. In this state, a direction in which the cover section 31 extends from the second pivot shaft J2 is near to the upper direction, and is in the rear surface direction of the recording device 1 with respect to the second pivot shaft J2.

In the present embodiment, with respect to the front-rear direction of the recording device 1, when the gravity center position of the cover section 31 is closer toward the placement section 21 side than is the position of the second pivot shaft J2, the wall of the rail-shaped groove of the first rail section 231 comes out of contact with the protrusion 232, and the protrusion 232 becomes free with respect to the groove of the first rail section 231.

In the third transition state shown in FIG. 14, the placement section 21 is further open toward the use state about the first pivot shaft J1. In this state, the protrusion 232 of the first interlocking section 211 is disengaged from the rail-shaped groove of the first rail section 231. In this state, a direction in which the cover section 31 extends from the second pivot shaft J2 is, with respect to the front-rear direction of the recording device 1, in the rear surface direction of the recording device 1 with respect to the second pivot shaft J2.

In the fourth transition state shown in FIG. 15, the placement section 21 is further open about the first pivot shaft J1 toward the use state. In this state, a direction in which the placement section 21 extends from the first pivot shaft J1 is near the upper direction. In this state, the protrusion 232 of the first interlocking section 211 is in contact with the vicinity of the end section of the second portion B2. In this state, a direction in which the cover section 31 extends from the second pivot shaft J2 is near the rear surface direction of the recording device 1 with respect to the front-rear direction of the recording device 1.

Here, in the fourth transition state, the posture of the cover section 31 is in the covering state. In the present embodiment, the placement section 21 is further open independently to a rear surface side, so that the protrusion 232 is separated from the first rail section 231 and the placement section 21 becomes in the placement section use state.

That is, in the third transition state and the fourth transition state, the protrusion 232 moves along the second portion B2 provided in the placement section 21. When the placement section 21 is further opened from the fourth transition state and the protrusion 232 passes beyond the second portion B2, the protrusion 232 and the first rail section 231 move out of an interlocking state and move independently.

In the placement section use state shown in FIG. 16, a direction in which the placement section 21 extends from the first pivot shaft J1 is the rear surface direction of the recording device 1 with respect to the first pivot shaft J1 with respect to the front-rear direction of the recording device 1. In this state, the protrusion 232 of the first interlocking section 211 remains disengaged from the first rail section 231. In this state, a direction in which the cover section 31 extends from the second pivot shaft J2 is near the rear surface direction of the recording device 1 with respect to the front-rear direction of the recording device 1.

Here, in the present embodiment, a posture of the cover section 31 is the same in the fourth transition state shown in FIG. 15 and the placement section use state shown in FIG. 16, and the cover section 31 is in the covering state.

The protrusion 232 follows the first portion B1 from the placement section stored state shown in FIG. 11, via the first transition state shown in FIG. 12, to near the second transition state shown in FIG. 13.

The protrusion 232 follows the second portion B2 from the vicinity of the second transition state shown in FIG. 13, via the third transition state shown in FIG. 14, to the vicinity of the fourth transition state shown in FIG. 15.

As described above, the first rail section 231 includes a first portion B1 for sandwiching and guiding the protrusion 232, and a second portion B2 for guiding the protrusion 232 by contacting the protrusion 232.

The first portion B1 guides the protrusion 232 while the cover section 31 rises in the vertical direction from the open state. Here, a state in which the cover section 31 rises in the vertical direction is a state near to the second transition state shown in FIG. 13.

When the placement section 21 is in the use state and the cover section 31 is in the covering state, the protrusion 232 is not in contact with the first rail section 231.

As described above, the recording device 1 according to the present embodiment includes the placement section 21, the housing 11, the cover section 31, and the first interlocking section 211.

The placement section 21 is pivotable about the first pivot shaft J1 between the use state in which the medium M1 to be recorded on by the recording section 121 can be supported and the stored state in which the medium M1 cannot be supported.

The housing 11 accommodates the recording section 121, and forms the sheet feeding port 111 through which the medium M1 supported on the placement section 21 can pass.

The cover section 31 is pivotable about the second pivot shaft J2 between the covering state in which the cover section 31 covers at least a part of the sheet feeding port 111 and the open state in which the cover section 31 opens up the sheet feeding port 111.

The first interlocking section 211 pivots the cover section 31 from the open state to the covering state when the placement section 21 pivots from the stored state to the use state, and pivots the cover section 31 from the covering state to the open state when the placement section 21 pivots from the use state to the stored state.

The cover section 31 in the open state is in a posture along the placement section 21 in the stored state.

The sheet feeding port 111 is located between the first pivot shaft J1 and the second pivot shaft J2.

Note that the first pivot shaft J1 is an example of a pivot shaft of the placement section 21, the second pivot shaft J2 is an example of a pivot shaft of the cover section 31, and the first interlocking section 211 is an example of an interlocking section.

The third pivot shaft J3 is an example of a pivot shaft of the upper cover 41.

Therefore, in the recording device 1 according to the present embodiment, since at least a part of the sheet feeding port 111 can be covered with the cover section 31 in the covering state of the cover section 31, it is possible to effectively suppress foreign matter from falling into the sheet feeding port 111.

Further, in the recording device 1 according to the present embodiment, the cover section 31 is pivotable between the covering state and the open state and since the cover section 31 is in the open state, which is a posture along the placement section 21, while the placement section 21 is pivoted into the stored state by the first interlocking section 211, interference between the cover section 31 and the placement section 21 can be avoided, thereby suppressing enlargement of the recording device.

In the recording device 1 according to the present embodiment, since the sheet feeding port 111 is located between the first pivot shaft J1 and the second pivot shaft J2, if there were no first interlocking section 211, there would be a possibility that when pivoting into the stored state, the placement section 21 could interfere with the cover section 31 that is in the covering state. However, because the cover section 31 in the covering state pivots to the open state when the placement section 21 is pivoted into the stored state by the first interlocking section 211, it is possible to prevent such interference.

In the recording device 1 according to the present embodiment, in the case where the cover section 31 prevented falling foreign matter from falling, the cover section 31 cannot be completely opened into the open state, so that a user can easily notice the presence of the foreign matter.

In this way, in the recording device 1 according to the present embodiment, by interlocking the opening and closing of the placement section 21 and cover section 31, it is possible to suppress that foreign matter falls into the sheet feeding port 111 and to improve the operability of placement section 21 and cover section 31.

Here, as an aspect of the covering state in which the cover section 31 covers at least a part of the sheet feeding port 111, for example, an aspect is used in which the cover section 31 covers at least a part of the sheet feeding port 111 in the width direction of the recording device 1 and the cover section 31 covers at least a part of the sheet feeding port 111 in the depth direction of the recording device 1. As an example, an aspect may be used in which the cover section 31 covers the entire sheet feeding port 111 in the width direction of the recording device 1 and the cover section 31 covers the entire sheet feeding port 111 in the depth direction of the recording device 1.

Note that even in a case where the openable and closable upper cover 41 is not provided, there is a possibility that foreign matter falls into the sheet feeding port 111 from above. Therefore, even in a case where the openable and closable upper cover 41 is not provided, the effect of suppressing the entry of foreign matter from the sheet feeding port 111 by the cover section 31 can be obtained.

The timing of the start of movement by the pivot of the placement section 21, the timing of the start of movement by the pivot of the cover section 31, for example, may be the same timing, or a different timing, that is, there may be a time lag in these interlocking.

In the recording device 1 according to the present embodiment, the first interlocking section 211 includes a guided section which is provided to one of the placement section 21 and the cover section 31, and a guide section which is provided to the other of the placement section 21 and the cover section 31 and guides the guided section.

Therefore, in the recording device 1 according to the present embodiment, interlocking can be realized by guiding the guided section with the guide section, and for example, since a drive source or the like is unnecessary, interlocking can be realized with a simple configuration.

Note that of the placement section 21 and the cover section 31, the guide section may be provided on either one, and the guided section is provided on the other.

In the recording device 1 according to the present embodiment, the guided section is the protrusion 232 provided on the cover section 31. The guide section is the first rail section 231 that is provided on the placement section 21 and that guides the protrusion 232.

Therefore, in the recording device 1 according to the present embodiment, the protrusion 232 provided on the cover section 31 is guided by a rail of the first rail section 231 provided on the placement section 21, so that interlocking can be realized with a simple configuration.

Note that the first rail section 231 is an example of a rail section.

Here, in the present embodiment, the first rail section 231 is configured to hold the protrusion 232 only by a part corresponding to the first portion B1, but as another example, may be configured to always hold the protrusion 232, for example, instead of providing the first portion B1 and the second portion B2, a configuration in which a groove of the first portion B1 is formed in a hole shape and the protrusion 232 is always accommodated in the hole shape may be used.

For example, in a configuration in which the first rail section 231 always holds the protrusion 232, the cover section 31 cannot be set to the open state when the placement section 21 is in the use state, so that the falling of foreign matter can be more effectively suppressed.

In the recording device 1 according to the present embodiment, the first rail section 231 includes the first portion B1 for sandwiching and guiding the protrusion 232, and the second portion B2 for guiding the protrusion 232 by contacting the second portion B2. Therefore, in the recording device 1 according to the present embodiment, by providing the first portion B1, which restricts the behavior of the cover section 31 by sandwiching the protrusion 232, and the second portion B2, which, by merely contacting the protrusion 232, increases the degree of freedom of the behavior of the cover section 31 compared to the first portion B1, it is possible to secure ease of opening and closing of the placement section 21 while realizing interlocking of the cover section 31 and the placement section 21.

Here, for example, a configuration may be used in which a groove or the like which allows the first portion B1 to enter an upper surface of the upper cover 41, an upper surface of the housing 11, or the like is provided on the upper surface of the upper cover 41, the upper surface of the housing 11, or the like, and thus further miniaturization is achieved.

Note that in the present embodiment, for example, as shown in FIG. 7, only the lower side of a guide of the first portion B1 of the first rail section 231 has a slight gap with respect to the upper cover 41 and the housing 11.

In the recording device 1 according to the present embodiment, the first portion B1 guides the protrusion 232 until the cover section 31 rises in the vertical direction from the open state.

Here, in the recording device 1 according to the present embodiment, since the cover section 31 can be displaced toward the covering state by its own weight after the cover section 31 rises in the vertical direction, it is not always necessary to sandwich the protrusion 232.

Therefore, in the recording device 1 according to the present embodiment, the protrusion 232 is guided by the second portion B2 at an arbitrary timing after the cover section 31 rises, and thus it is possible to easily open and close the placement section 21.

Here, the boundary between the guidance by the first portion B1 and the guidance by the second portion B2 may not necessarily be a position has risen the cover section 31 rises in the vertical direction, and for example, a configuration may be adopted in which the guidance by the first portion B1 transitions to the guidance by the second portion B2 in an arbitrary state in which the cover section 31 is inclined to the covering state side from a state where the cover section 31 rises in the vertical direction.

Note that for example, in a state in which the cover section 31 is inclined to the side of the covering state from a state where the cover portion 31 rises in the vertical direction, in addition to the self-weight of the cover section 31, a configuration such as a spring force (not shown) for displacing the cover section 31 in a direction of the covering state may be used.

As described above, the recording device 1 according to the present embodiment may further include a biasing section (not shown) for urging the cover section 31 to the covering state.

Therefore, in the recording device 1 according to the present embodiment, by urging the cover section 31 to the covering state, it is possible to more effectively suppress the falling of foreign matter.

Here, as the biasing section, for example, for example, a spring, plastic, or the like may be used.

In the recording device 1 according to the present embodiment, when the placement section 21 is in the use state and the cover section 31 is in the covering state, the protrusion 232 is not in contact with the first rail section 231.

Therefore, in the recording device 1 according to the present embodiment, since the protrusion 232 is not in contact with the first rail section 231 when the medium M1 is set, for example, it is easy to perform an operation of setting the medium M1 while independently opening the cover section 31.

Note that when the placement section 21 is in the use state and the cover section 31 is in the covering state, for example, a configuration may be used in which a portion other than the protrusion 232 in the cover section 31 is in contact with the placement section 21. For example, a configuration may be adopted in which a rotating body or the like capable of sliding on the medium M1 is in contact with the placement section 21.

The recording device 1 according to the present embodiment may be configured to include the upper cover 41 that is pivotable with respect to the housing 11 about the third pivot shaft J3.

The third pivot shaft J3 is located at an end section of the upper cover 41 located between the cover section 31 in the open state and the placement section 21 in the use state.

The cover section 31 is pivotably provided with respect to the upper cover 41.

Therefore, in the recording device 1 according to the present embodiment, when the upper cover 41 is opened, there is a possibility that foreign matter supported on the upper cover 41 may fall into the sheet feeding port 111, but the cover section 31 can prevent such foreign matter from falling. In the recording device 1 according to the present embodiment, since the cover section 31 is pivotable with respect to the upper cover 41, it is possible to prevent the cover section 31 from interfering with the placement section 21 and the like when the upper cover 41 is pivoted.

Here, as an aspect in which the third pivot shaft J3 is located at an end section of the upper cover 41 located between the cover section 31 in the open state and the placement section 21 in the use state, for example, the third pivot shaft J3 is located at an end section of the upper cover 41 on a side of the sheet feeding port 111.

The recording device 1 according to the present embodiment may be provided with the reading unit 51 for reading a document and the upper cover 41 pivotable with respect to the reading unit 51 about the third pivot shaft J3.

The placement section 21 is provided pivotably with respect to the housing 11.

Therefore, in the recording device 1 according to the present embodiment, when the upper cover 41 is opened, there is a possibility that foreign matter supported on the upper cover 41 may fall into the sheet feeding port 111, but the cover section 31 can prevent such foreign matter from falling. In the recording device 1 according to the present embodiment, since the cover section 31 is pivotable with respect to the upper cover 41, it is possible to prevent the cover section 31 from interfering with the placement section 21 and the like when the upper cover 41 is pivoted.

Note that for example, the cover section 31 may be configured not to stop in a horizontal state but to stop in an upwardly inclined state in the covering state, and in this case, the cover section 31 is configured to easily catch foreign matter sliding down from the upper cover 41.

In the recording device 1 according to the present embodiment, the first pivot shaft J1 is located lower than the second pivot shaft J2.

Therefore, in the recording device 1 according to the present embodiment, since the first pivot shaft J1 of the placement section 21 is lower than the second pivot shaft J2 of the cover section 31, if there were no first interlocking section 211, interference between the placement section 21 and the cover section 31 would be likely to occur, but since the first interlocking section 211 is provided, it is possible to effectively suppress the interference.

Note that if an attempt were made to align the height between the first pivot shaft J1 and the second pivot shaft J2, it would be necessary to increase the height of a shaft on the main body side with respect to the cover section 31, which was originally on an upper side, and there is a possibility that the device may increase in size.

Therefore, in the recording device 1 according to the present embodiment, in a configuration where the first pivot shaft J1 is located below the second pivot shaft J2, it is effective to include the first interlocking section 211.

In this way, in the recording device 1 according to the present embodiment, by interlocking the pivot of the cover section 31, which can pivot with the sheet feeding port 111 side as its free end, and the pivot of the placement section 21, which can be laid onto the cover section 31, it is possible to avoid interference between the cover section 31 and the placement section 21 and to suppress an increase in size of the device while using the cover section 31 to effectively suppress foreign matter from falling into the sheet feeding port 111. That is, in the recording device 1 according to the embodiment, a mechanism for interlocking the cover section 31 and the placement section 21 is provided in order to suppress the pivotable cover section 31 from interfering with the pivotable placement section 21 while enhancing the effect of suppressing foreign matter from falling into the sheet feeding port 111 by configuring the cover section 31 to be pivotable, and by these configurations, foreign matter is effectively suppressed from falling into the sheet feeding port 111.

Note that for example, if the cover section is always inclined, it is necessary to provide a clearance so that the placement section when reclined does not interfere with a cover section, and there is a possibility that the device may be increased in size. On the other hand, when a cover section is inclined toward a sheet feeding port and is capable of pivoting, the cover section could be made to overlap the sheet feeding port while suppressing an increase in size of the device, but the cover section may hinder pivot of the placement section.

Here, in the present embodiment, a case where the configuration of the first interlocking section 211 or the like is applied to the recording device 1 including a scanner has been described, but as another example, the configuration may be applied to a recording device including an automatic document feeder (ADF) instead of or in addition to the scanner.

For example, the upper cover 41 may be a cover of a flatbed type scanner, or may be an ADF unit.

For example, the upper cover 41 may be a cover provided for maintenance or the like in a recording device having only a printer function. The recording device may be, for example, a single function printer that does not include a document placement section.

As a specific example, the recording device 1 according to the present embodiment includes the upper cover 41 that covers the document placement surface, a scanner function, and the sheet feeding port 111 of the feeding mechanism arranged near the hinge of the upper cover 41. The cover section 31, which prevents foreign matter from falling into the sheet feeding port 111, is, in linked movement with the placement section 21, stored on the upper cover 41 when the placement section 21 is stored onto the upper cover 41 when the placement section 21 is not being used and moved to a position that covers part of the sheet feeding port 111 when the placement section 21 is opened into the use position.

Therefore, in the recording device 1 according to the present embodiment, for example, the cover section 31 for preventing foreign matter from falling can be changed between the open state and the covering state in accordance with the opening and closing of the placement section 21 without a user's awareness. In the present embodiment, for example, since the cover section 31 is configured to be stored in the upper cover 41, the cover section 31 and the placement section 21 will not reach a complete stored position if foreign matter exists, so that a user can be made to recognize that foreign matter exists. In the present embodiment, for example, when the placement section 21 is in the use position, the connection with the cover section 31 is released, and thus, it is possible to freely open and close the cover section 31, and setting property of the medium M1 is improved.

A modification of the first embodiment will be described. With reference to FIGS. 18 to 22, an a-th recording device 1*a* provided with a 1a-th interlocking section 211*a* according to the modification will be described.

The a-th recording device 1*a* is a modification of the recording device 1 according to the first embodiment.

In the description of the present modification, the configuration of the vicinity of the 1a-th interlocking section 211*a* of the a-th recording device 1*a* will be shown and described. The constituent sections of the a-th recording device 1*a*, other than the 1a-th interlocking section 211*a*, are the same as, for example, the constituent sections of the recording device 1, and will be described using the same reference symbols as in the first embodiment as necessary.

Here, in the recording device 1 according to the first embodiment, at the angle of the placement section 21 shown in FIGS. 15 and 16, the interlock with the cover section 31 is released and the cover section 31 can be freely opened and closed, and thus, improvement of setting property of the medium M1 is realized. However, when the cover section 31 is in the open state, in which it is stored on the upper cover 41, if the placement section 21 is placed into the closed and stored state, there is a possibility that the protrusion 232 and the first rail section 231 do not move in conjunction so that synchronized movement is not realized.

Therefore, in the present modification, the 1a-th interlocking section 211*a* is a mechanism capable of preventing such a situation.

An example of the interlocking operation of the 1a-th interlocking section 211*a* will be described with reference to FIGS. 18 to 22.

Figure 18:
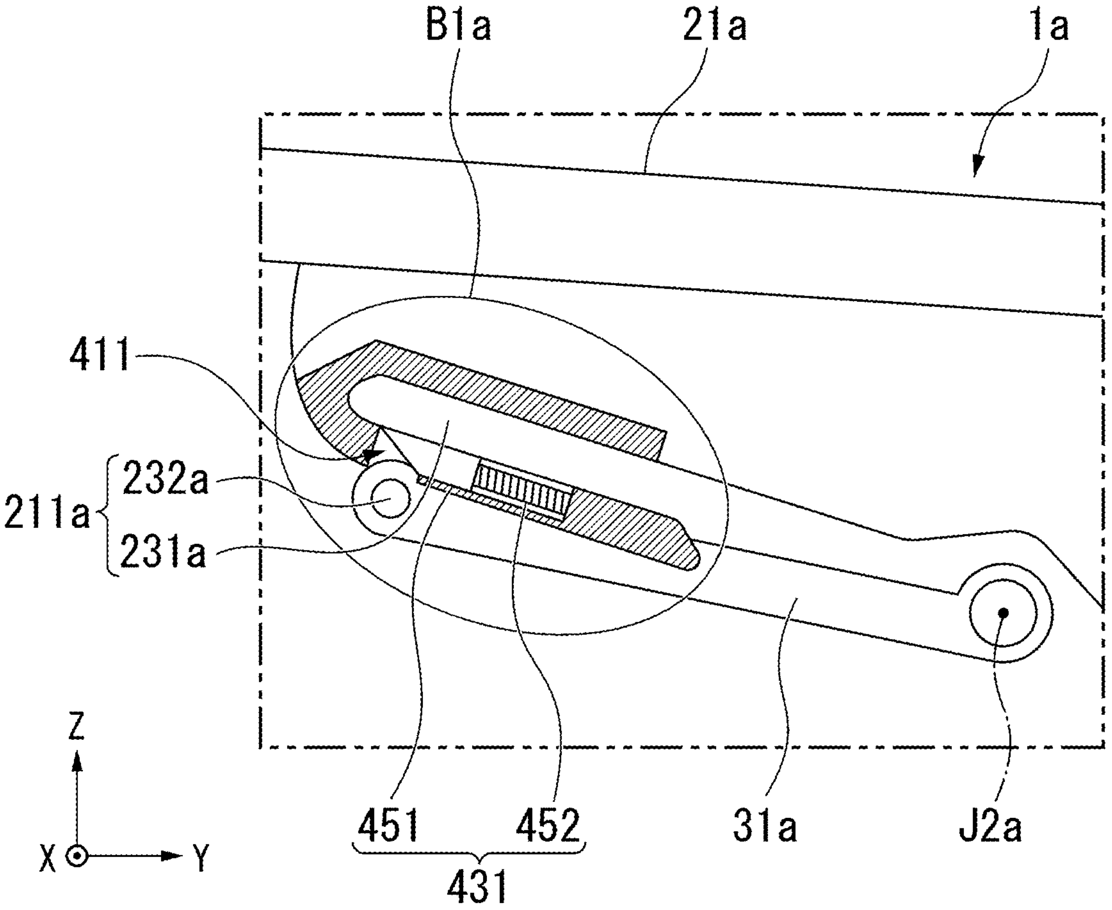
FIG. 18 is a view showing a configuration example of a 1a-th interlocking section of an a-th recording device according to a modification of the first embodiment.

FIG. 18 is a view showing a configuration example of the 1a-th interlocking section 211*a* of the a-th recording device 1*a* according to the modification of the first embodiment. This state is referred to as a first open and close state.

Figure 19:
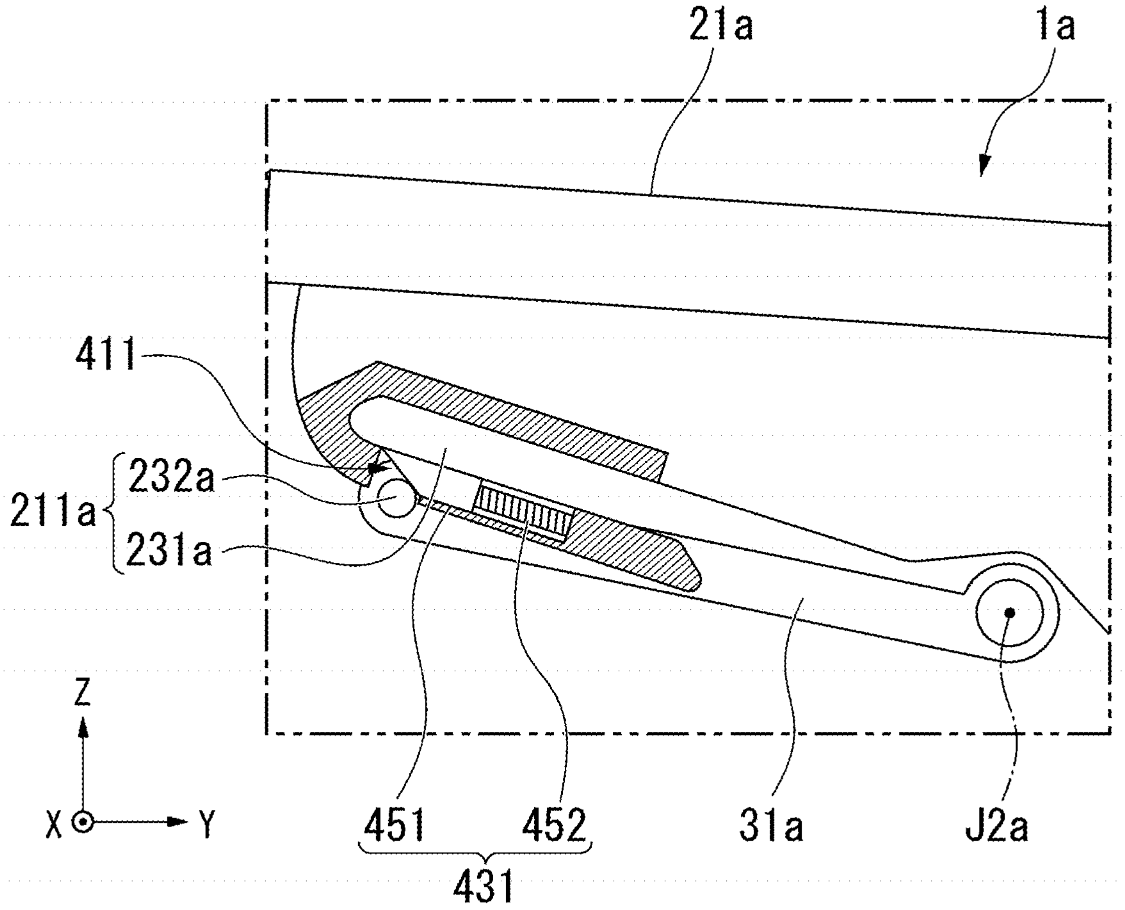
FIG. 19 is a view showing the configuration example of the 1a-th interlocking section of the a-th recording device according to the modification of the first embodiment.

FIG. 19 is a view showing a configuration example of the 1a-th interlocking section 211*a* of the a-th recording device 1*a* according to the modification of the first embodiment. This state is referred to as a second open and close state.

Figure 20:
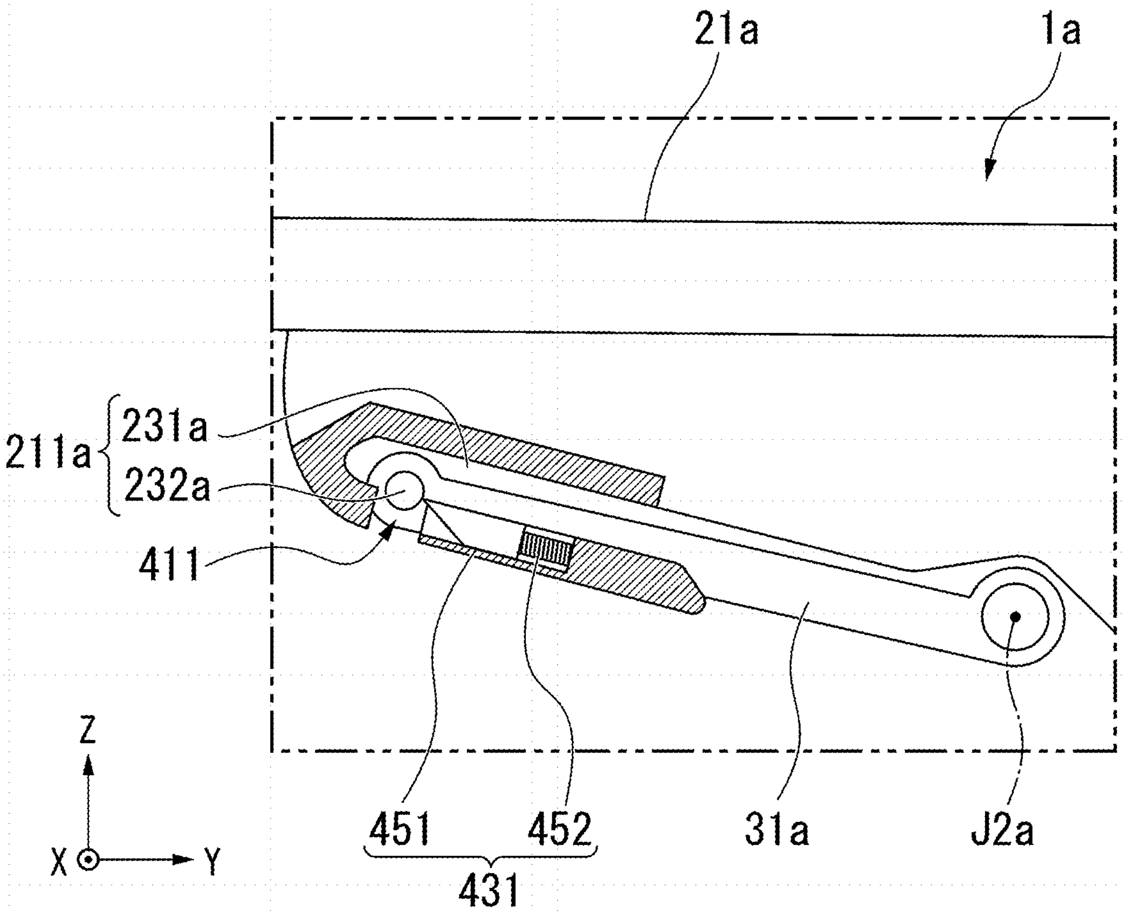
FIG. 20 is a view showing the configuration example of the 1a-th interlocking section of the a-th recording device according to the modification of the first embodiment.

FIG. 20 is a view showing a configuration example of the 1a-th interlocking section 211*a* of the a-th recording device 1*a* according to the modification of the first embodiment. This state is referred to as a third open and close state.

Figure 21:
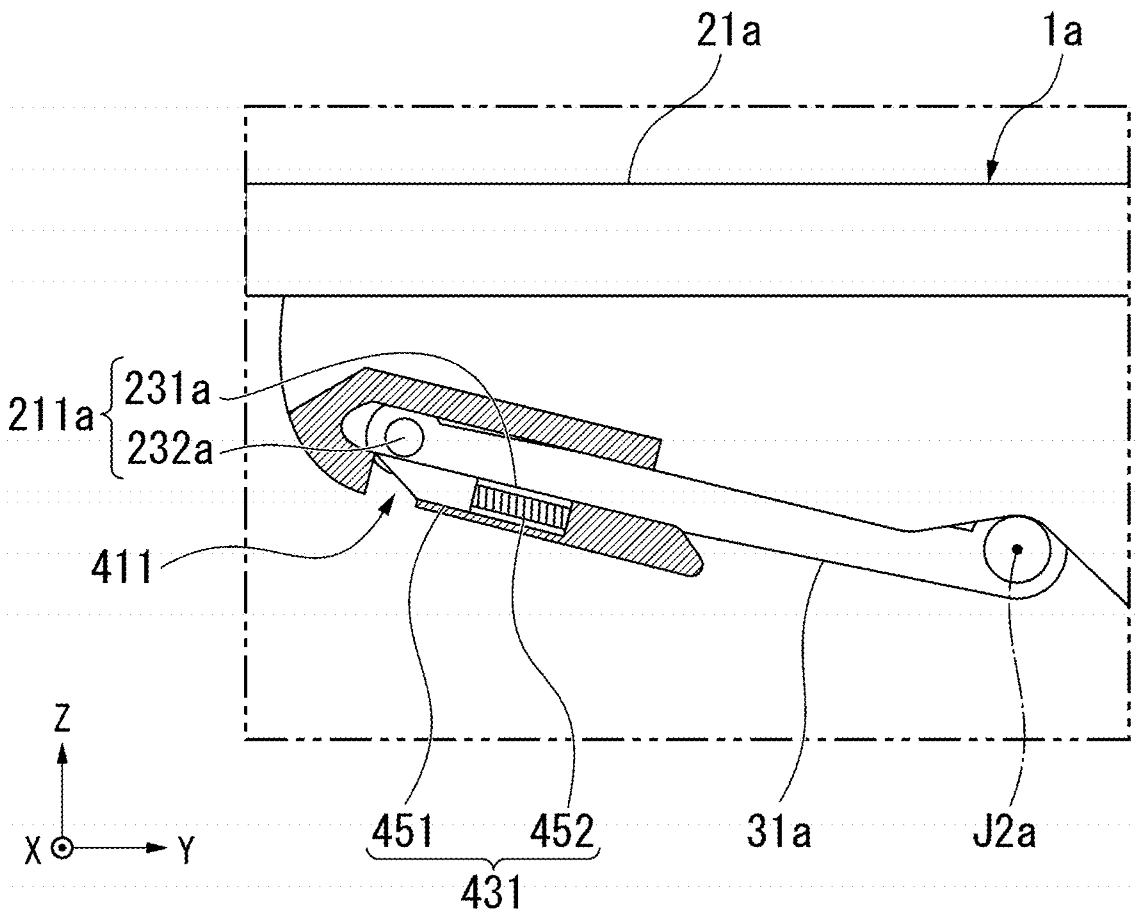
FIG. 21 is a view showing the configuration example of the 1a-th interlocking section of the a-th recording device according to the modification of the first embodiment.

FIG. 21 is a view showing a configuration example of the 1a-th interlocking section 211*a* of the a-th recording device 1*a* according to the modification of the first embodiment. This state is referred to as a fourth open and close state.

Each of FIGS. 18 to 21 shows X-Y-Z orthogonal coordinate axes similar to those of FIG. 1.

FIGS. 18 to 21 show an a-th placement section 21*a* and an a-th cover section 31*a* provided in the a-th recording device 1*a*. FIGS. 18 to 21 show a 2a-th pivot shaft J2*a* of the a-th cover section 31*a*.

Here, in the present modification, except for the configuration of the 1a-th interlocking section 211*a*, the configurations of the a-th placement section 21*a* and the a-th cover section 31*a* are the same as the configurations of the placement section 21 and the cover section 31 according to the first embodiment.

The 1a-th interlocking section 211*a* includes a 1a-th rail section 231*a* provided on the a-th placement section 21*a* and an a-th protrusion 232*a* provided on the a-th cover section 31*a*. Here, the 1a-th rail section 231*a* is different from the first rail section 231 according to the first embodiment in that the 1a-th rail section 231*a* includes a passing region 411 and an opening and closing section 431, and is the same in other respects.

The opening and closing section 431 includes a slider 451 and a compression spring 452.

The 1a-th rail section 231*a* includes the passing region 411 that is, when the a-th placement section 21*a* is in the stored state, below the vicinity of a tip end in a direction extending from the 2a-th pivot shaft J2*a*. The passing region 411 is formed in a 1A-th portion B1*a* of the 1a-th rail section 231*a*. Here, the 1A-th portion B1*a* is the same as the first portion B1 according to the first embodiment. Note that the 1A-th portion B1*a* is shown in FIG. 18, and the 1A-th portion B1*a* is not shown in other drawings.

The passing region 411 has a size that allows the a-th protrusion 232*a* of the a-th cover section 31*a* to pass therethrough. That is, in a state in which the passing region 411 is open, the a-th protrusion 232*a* can be stored in a rail-shaped groove of the 1a-th rail section 231*a* from below the passing region 411 via the passing region 411.

The opening and closing section 431 includes a mechanism for switching the open and close state of the passing region 411 between an open state and a closed state.

Specifically, the slider 451 is arranged so as to be movable between a position at which the passing region 411 is open and a position at which the passing region 411 is closed. The compression spring 452 biases the slider 451 with a force in a direction that causes the slider 451 to move to a position where the passing region 411 is closed.

The slider 451 includes an inclined surface in the vicinity of its tip end in a direction in which the a-th cover section 31*a* extends from the 2a-th pivot shaft J2*a*, and the inclined surface approaches the groove of the 1a-th rail section 231*a* toward the tip end.

With such a configuration, when the a-th protrusion 232*a* of the a-th cover section 31*a* applies a force to push the slider 451 upward from below the slider 451, the slider 451 moves so as to open the passing region 411, and the a-th protrusion 232*a* is stored in the rail-shaped groove of the 1a-th rail section 231*a*. Thereafter, the slider 451 is returned to a position for closing the passing region 411 by biasing force of the compression spring 452.

By this, when the a-th cover section 31*a* is in the open state of being stored on the upper cover 41, even when the a-th placement section 21*a* is closed into the stored state, the a-th protrusion 232*a* and the 1a-th rail section 231*a* move in conjunction with each other, and synchronized movement is realized.

In this case, the 1a-th interlocking section 211*a* transitions from the first open and close state shown in FIG. 18 to the second open and close state shown in FIG. 19, the third open and close state shown in FIG. 20, and the fourth open and close state shown in FIG. 21.

Here, the first open and close state is a state immediately before the a-th protrusion 232*a* enters the passing region 411. The second open and close state and the third open and close state are states in which the a-th protrusion 232*a* is in the process of entering and passing through the passing region 411. The fourth open and close state is a state after the a-th protrusion 232*a* enters the passing region 411.

As shown in FIG. 18, the a-th protrusion 232*a* of the a-th cover section 31*a* is located at a lower position and, when the a-th placement section 21*a* is stored from above the a-th protrusion 232*a*, the inclined surface of the slider 451 provided on a lower side of the groove of the 1a-th rail section 231*a* contacts and interferes with the a-th protrusion 232*a*.

Thereafter, as shown in FIGS. 19 and 20, the a-th protrusion 232*a* pushes the inclined surface of the slider 451, so that the slider 451 moves parallel or substantially parallel to the groove and retreats to a position away from the passing region 411. As a result, the a-th protrusion 232*a* returns to a position in the groove of the 1a-th rail section 231*a* through a passage of the opened passing region 411, and a normal state shown in FIG. 21 is obtained. When the a-th protrusion 232*a* is stored in the groove of the 1a-th rail section 231*a*, the slider 451 is returned to its original position by a pressing mechanism made of the compression spring 452, and constitutes a part of the groove.

As described above, in the 1a-th interlocking section 211*a*, the 1A-th portion B1*a* is formed with the passing region 411 through which the a-th protrusion 232*a* can pass in a direction intersecting with a guide direction in which the a-th protrusion 232*a* is guided.

The 1a-th rail section 231*a* includes the opening and closing section 431 capable of opening and closing the passing region 411.

The passing region 411 is provided at a position facing the a-th protrusion 232*a* when the a-th placement section 21*a* is in the stored state and the a-th cover section 31*a* is in the open state.

Figure 22:
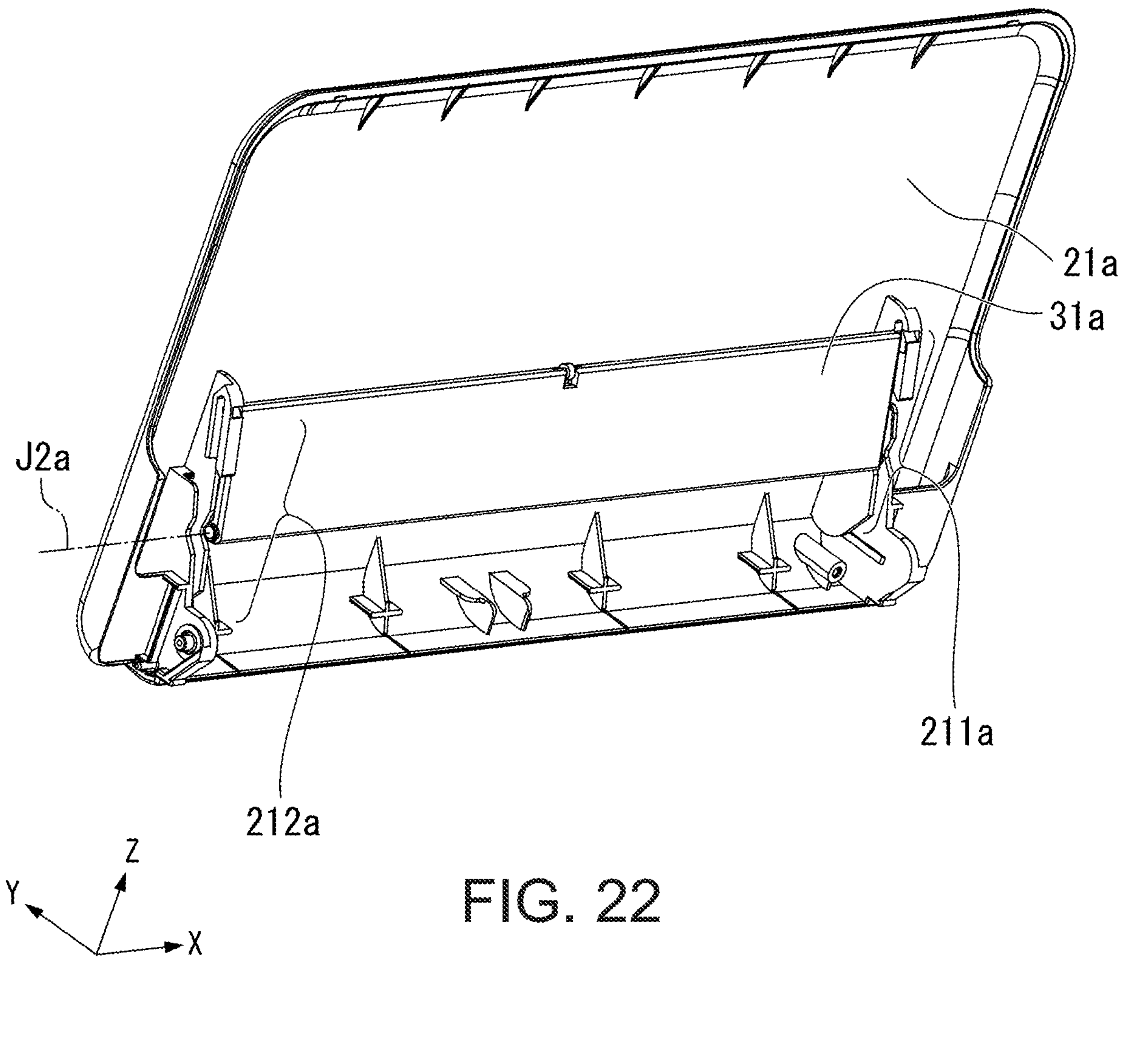
FIG. 22 is a view showing the configuration example of an a-th placement section and an a-th cover section of the a-th recording device according to the modification of the first embodiment.

FIG. 22 is a view showing a configuration example of the a-th placement section 21*a* and the a-th cover section 31*a* of the a-th recording device 1*a* according to the modification of the first embodiment.

FIG. 22 shows X-Y-Z orthogonal coordinate axes similar to those of FIG. 1.

FIG. 22 shows the fourth open and close state in the same manner as FIG. 21.

Also in the present modification, the a-th placement section 21*a*, the a-th cover section 31*a*, and the upper cover 41 are substantially bilaterally symmetrical with respect to the width direction of the a-th recording device 1*a* when viewed from a center line perpendicular to the width direction.

FIG. 22 shows a 1a-th symmetrical interlocking section 212*a*, which is a left interlocking section provided at a bilaterally symmetrical position with respect to the 1a-th interlocking section 211*a* provided on a right side of the a-th recording device 1*a*.

The 1a-th interlocking section 211*a* and the 1a-th symmetrical interlocking section 212*a* include, for example, a bilaterally symmetrical configuration.

As described above, in the a-th recording device 1*a* according to the modification of the first embodiment, the 1A-th portion B1*a* is formed with the passing region 411 through which the a-th protrusion 232*a* can pass in a direction intersecting with the guide direction in which the a-th protrusion 232*a* is guided.

The 1a-th rail section 231*a* further includes the opening and closing section 431 capable of opening and closing the passing region 411.

The passing region 411 is provided at a position facing the a-th protrusion 232*a* when the a-th placement section 21*a* is in the stored state and the a-th cover section 31*a* is in the open state.

Note that the a-th recording device 1*a* is an example of a recording device, the 1A-th portion B1*a* is an example of a first portion, the a-th protrusion 232*a* is an example of a protrusion, the 1a-th rail section 231*a* is an example of a first rail section, the a-th placement section 21*a* is an example of a placement section, and the a-th cover section 31*a* is an example of a cover section.

The 1a-th pivot shaft J1*a* is an example of a pivot shaft of the a-th placement section 21*a*, the 2a-th pivot shaft J2*a* is an example of a pivot shaft of the a-th cover section 31*a*, and the 1a-th interlocking section 211*a* and the 1a-th symmetrical interlocking section 212*a* are examples of left and right interlocking sections.

Here, for example, as in the recording device 1 according to the first embodiment, when the first rail section 231 is divided into the first portion B1 and the second portion B2, only the cover section 31 can be in the open state when the protrusion 232 is in the second portion B2, but if the placement section 21 is in the stored state in this condition, there is a possibility that the protrusion 232 will not be sandwiched by the first portion B1.

Therefore, in the a-th recording device 1*a* according to the present modification, since the passing region 411 is present at a position facing the a-th protrusion 232*a* while in such a state, it is possible to return to a state in which the a-th protrusion 232*a* is sandwiched by the 1A-th portion B1*a*.

Note that in the present embodiment, a case where the compression spring 452, which is a spring, is used as an elastic body is shown, but as another example, plastic or the like may be used.

A second embodiment will be described.

A b-th recording device 1*b* including a second interlocking section 611 according to the second embodiment will be described with reference to FIGS. 23 to 30.

In the description of the present embodiment, a configuration in the vicinity of the second interlocking section 611 of the b-th recording device 1*b* will be shown and described. The constituent sections of the b-th recording device 1*b*, other than the second interlocking section 611, are the same as, for example, the constituent sections of the recording device 1 according to the first embodiment, and will be described using the same reference symbols as in the first embodiment as necessary.

Figure 23:
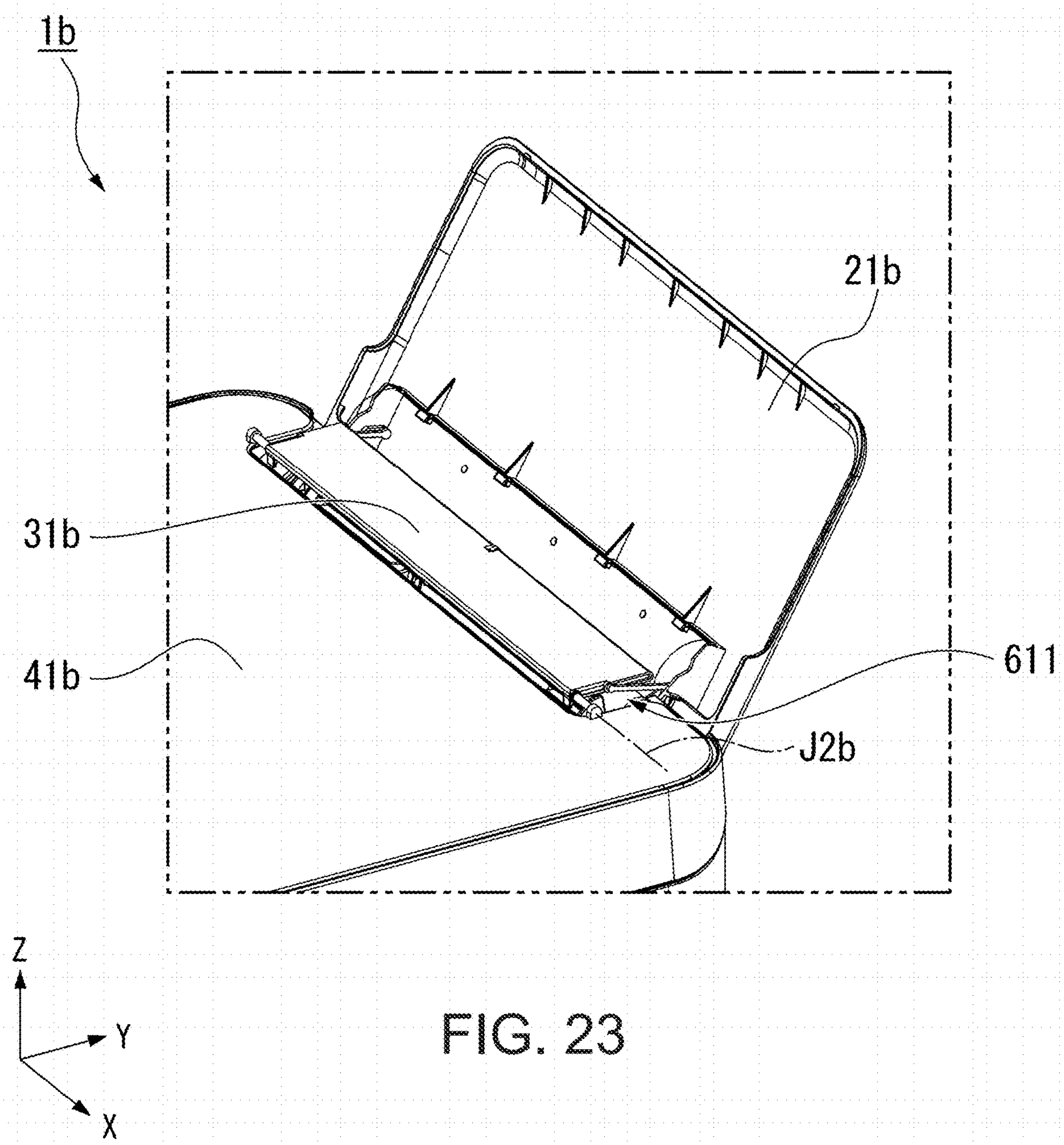
FIG. 23 is a view showing a configuration example of a second interlocking section of a b-th recording device according to a second embodiment.
Figure 24:
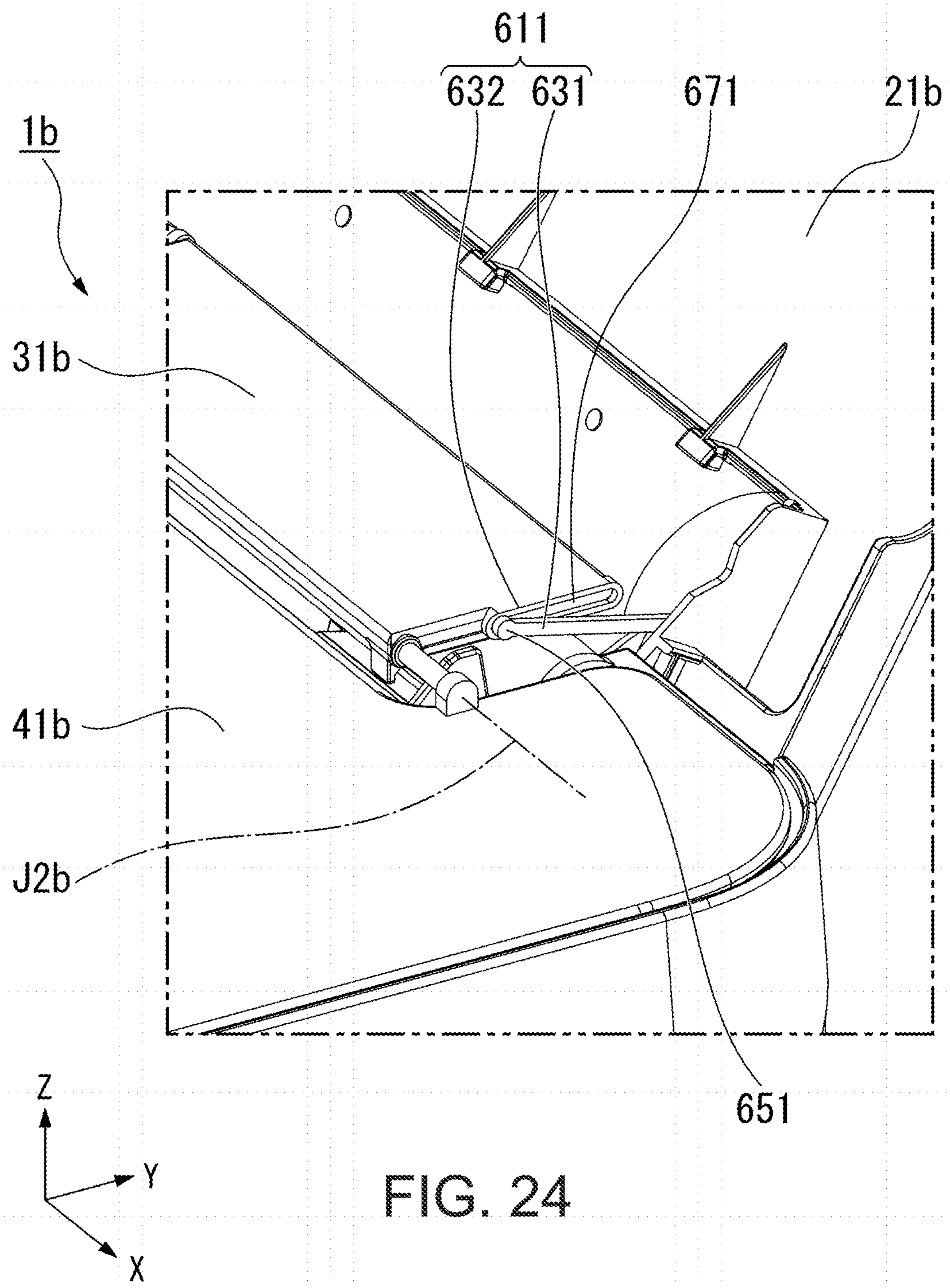
FIG. 24 is a view showing the configuration example of the second interlocking section of the b-th recording device according to the second embodiment.

FIGS. 23 and 24 are views showing a configuration example of the second interlocking section 611 of the b-th recording device 1*b* according to the second embodiment. FIG. 24 is an enlarged view showing the vicinity of the second interlocking section 611 shown in FIG. 23.

Each of FIGS. 23 and 24 shows X-Y-Z orthogonal coordinate axes similar to those of FIG. 1.

FIGS. 23 and 24 show a b-th placement section 21*b*, a b-th cover section 31*b*, and a b-th upper cover 41*b* provided in the b-th recording device 1*b*. FIGS. 23 and 24 show a 2b-th pivot shaft J2*b* of the b-th cover section 31*b*.

Here, in the present embodiment, except for the configuration of the second interlocking section 611, the configurations of the b-th placement section 21*b*, the b-th cover section 31*b*, and the b-th upper cover 41*b* are the same as the configurations of the placement section 21, the cover section 31, and the upper cover 41 according to the first embodiment.

Here, in the present embodiment, the b-th placement section 21*b*, the b-th cover section 31*b*, and the b-th upper cover 41*b* are substantially bilaterally symmetrical with respect to the width direction of the b-th recording device 1*b* when viewed from a center line perpendicular to the width direction.

Therefore, in the present embodiment, the configuration on a right side of the b-th placement section 21*b*, the b-th cover section 31*b*, and the b-th upper cover 41*b* will be described as an example, but the configuration on a left side is also bilaterally symmetrical and similar.

An example of an interlocking operation of the second interlocking section 611 including a mechanism for interlocking the b-th placement section 21*b* and the b-th cover section 31*b* will be described with reference to FIGS. 25 to 30.

Figure 25:
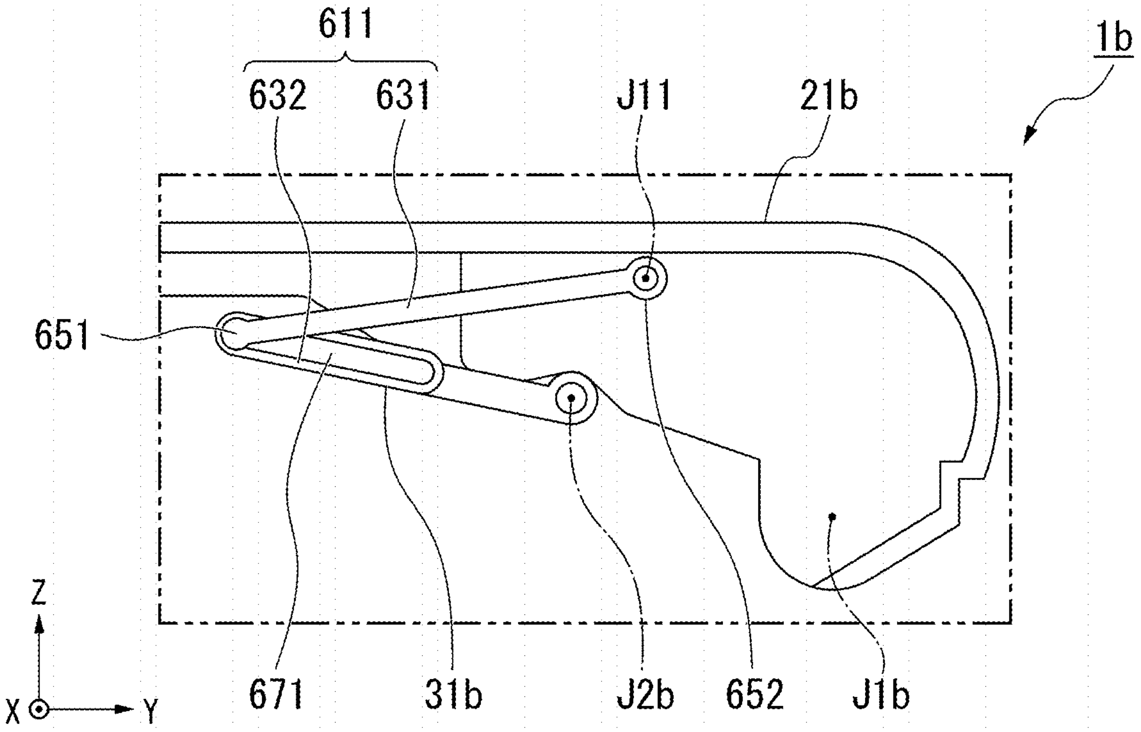
FIG. 25 is a view showing the configuration example of the second interlocking section of the b-th recording device according to the second embodiment.

FIG. 25 is a view showing a configuration example of the second interlocking section 611 of the b-th recording device 1*b* according to the second embodiment. This state is referred to as a first arm state. Note that in this state, the b-th placement section 21*b* is in the stored state, and the b-th cover section 31*b* is in the open state. This state may be referred to as, for example, a placement section stored state or a cover section open state.

Figure 26:
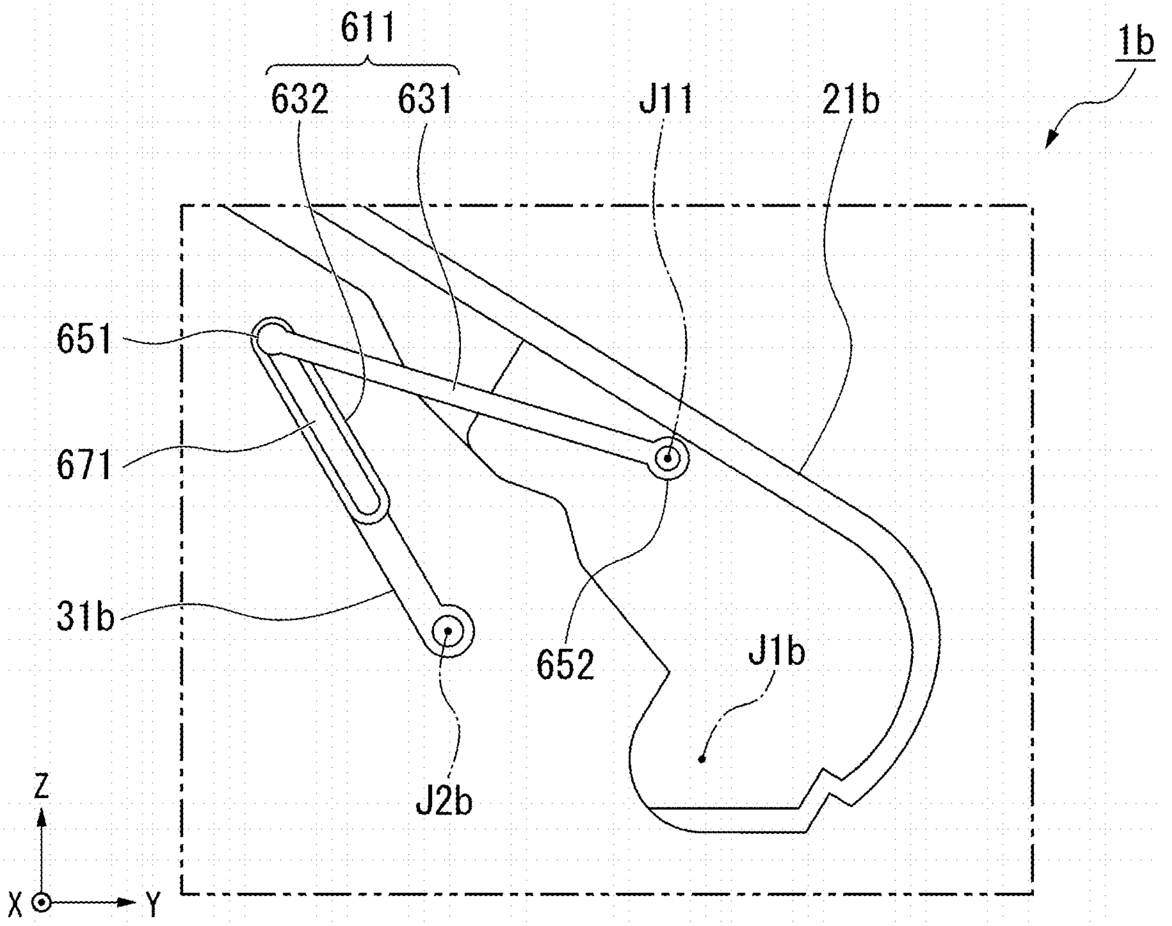
FIG. 26 is a view showing the configuration example of the second interlocking section of the b-th recording device according to the second embodiment.

FIG. 26 is a view showing a configuration example of the second interlocking section 611 of the b-th recording device 1*b* according to the second embodiment. This state is referred to as a second arm state.

Figure 27:
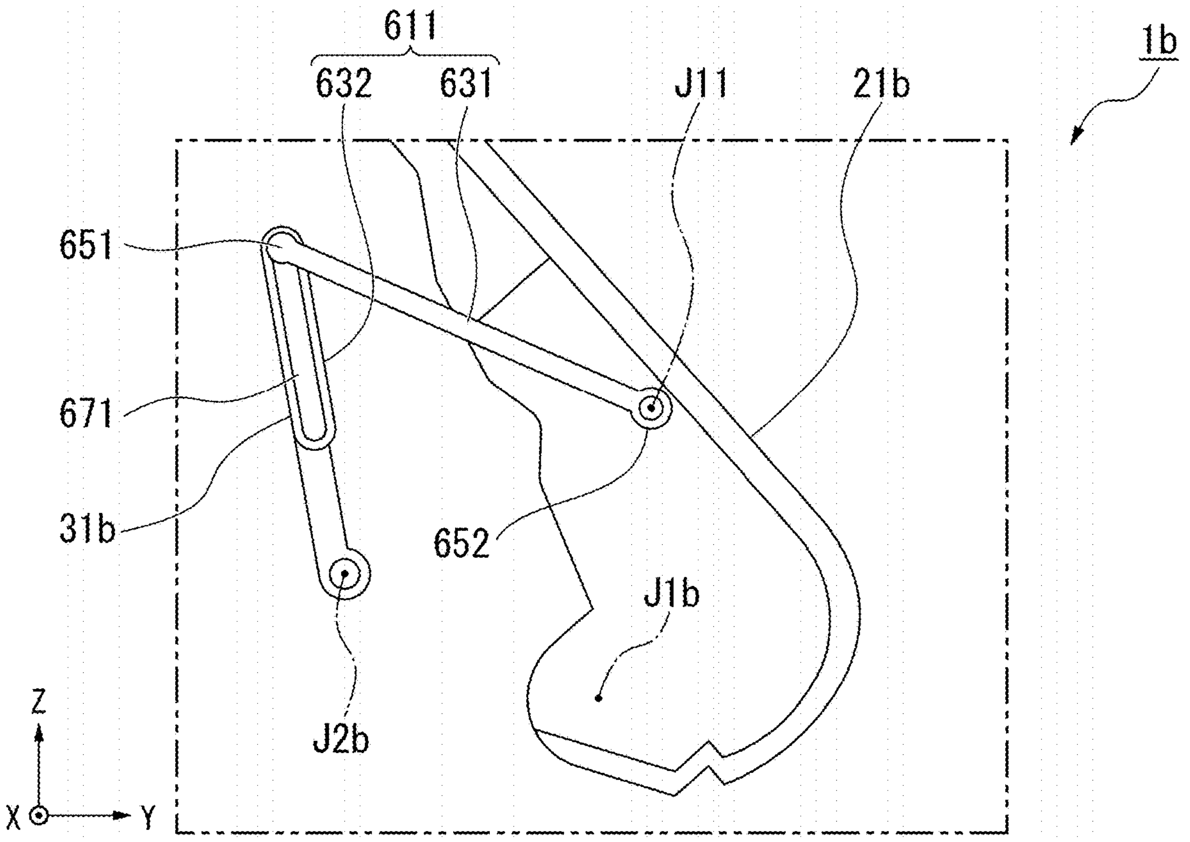
FIG. 27 is a view showing the configuration example of the second interlocking section of the b-th recording device according to the second embodiment.

FIG. 27 is a view showing a configuration example of the second interlocking section 611 of the b-th recording device 1*b* according to the second embodiment. This state is referred to as a third arm state.

Figure 28:
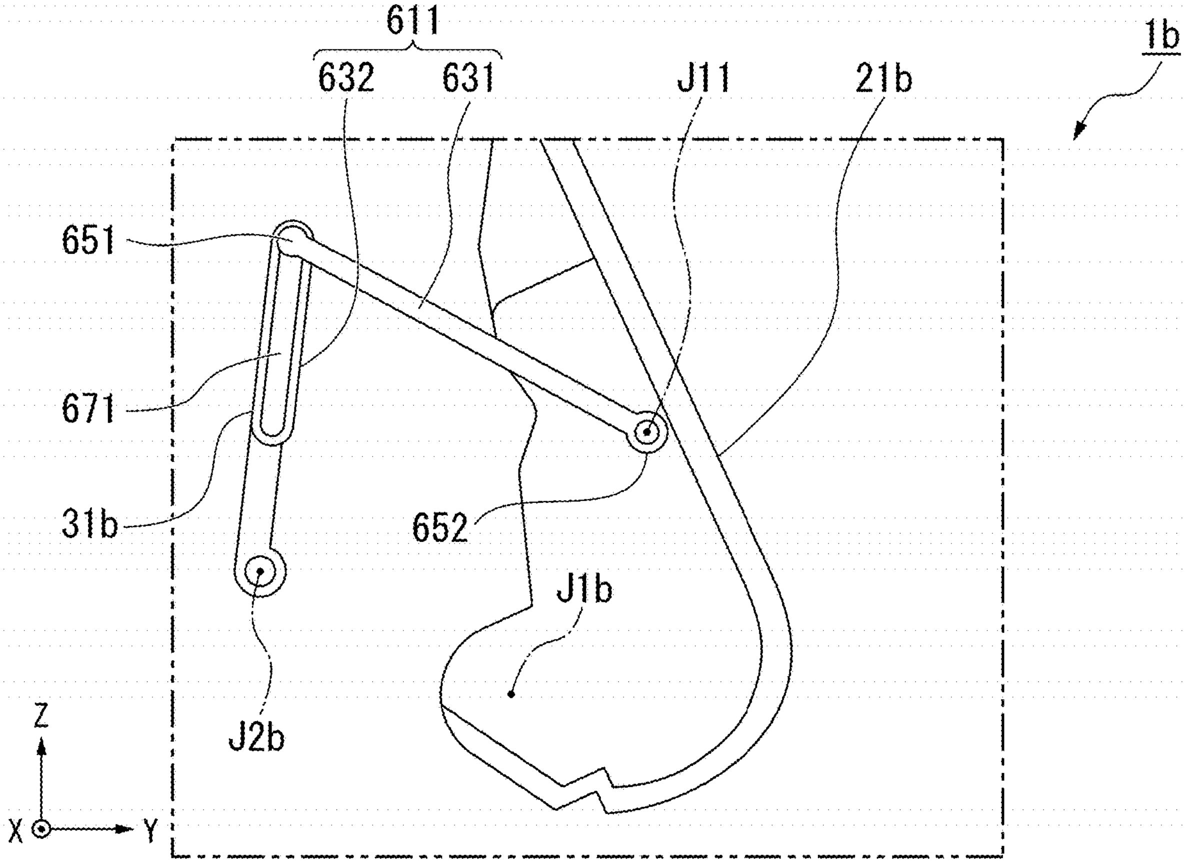
FIG. 28 is a view showing the configuration example of the second interlocking section of the b-th recording device according to the second embodiment.

FIG. 28 is a view showing a configuration example of the second interlocking section 611 of the b-th recording device 1*b* according to the second embodiment. This state is referred to as a fourth arm state.

Figure 29:
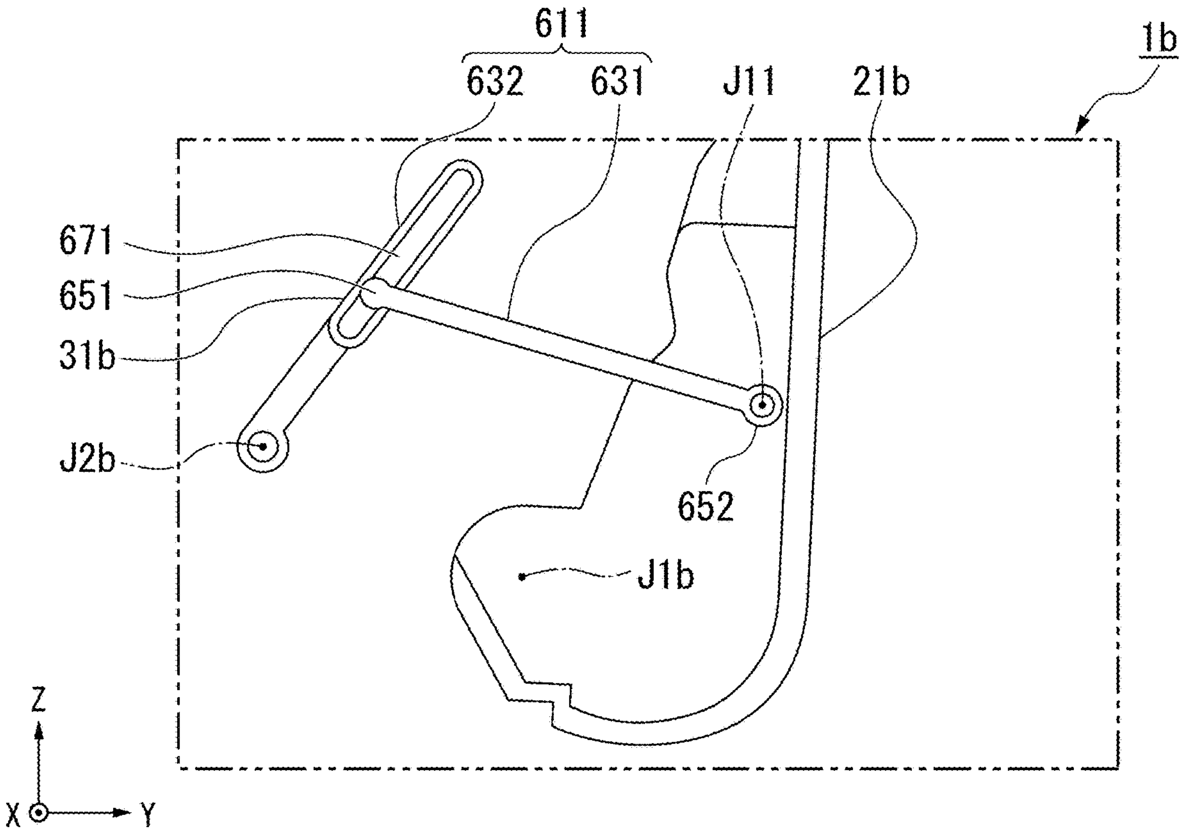
FIG. 29 is a view showing the configuration example of the second interlocking section of the b-th recording device according to the second embodiment.

FIG. 29 is a view showing a configuration example of the second interlocking section 611 of the b-th recording device 1*b* according to the second embodiment. This state is referred to as a fifth arm state.

Figure 30:
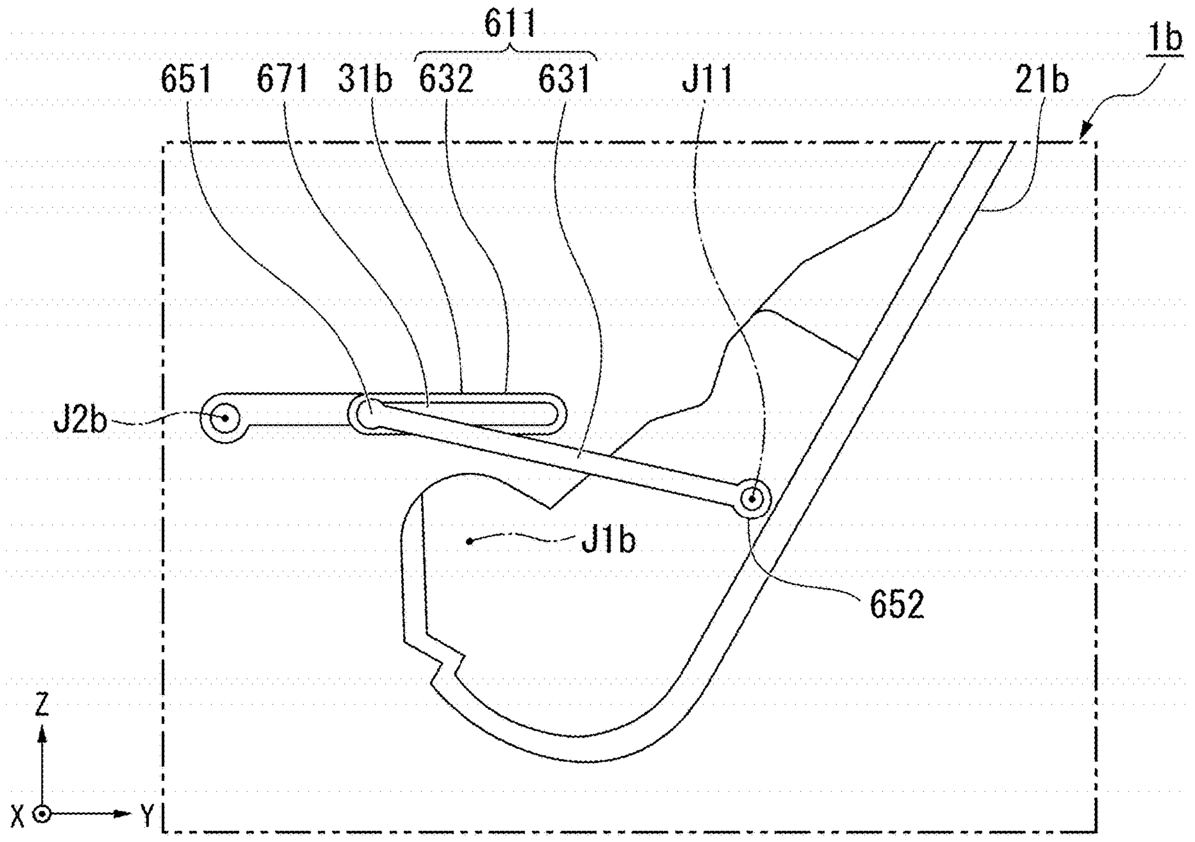
FIG. 30 is a view showing the configuration example of the second interlocking section of the b-th recording device according to the second embodiment.

FIG. 30 is a view showing a configuration example of the second interlocking section 611 of the b-th recording device 1*b* according to the second embodiment. This state is referred to as a sixth arm state. Note that in this state, the b-th placement section 21*b* is in the use state, and the b-th cover section 31*b* is in the covering state. This state may be referred to as, for example, a placement section use state or a cover section covering state.

Each of FIGS. 26 to 30 shows X-Y-Z orthogonal coordinate axes similar to those of FIG. 1.

The second interlocking section 611 includes an arm 631 provided on the b-th placement section 21*b* and a second rail section 632 provided on the b-th cover section 31*b*.

In the width direction of the b-th recording device 1*b*, the arm 631 is provided outside the second rail section 632.

The arm 631 has a substantially rod-like shape, one end of which is a free end 651 and the other end of which is a pivotable first base end 652. The first base end 652 is provided on the b-th placement section 21*b* so as to be pivotable with respect to the b-th placement section 21*b* about the eleventh pivot shaft J11 serving as a rotation fulcrum. The free end 651 includes a shape protruding toward the second rail section 632. This protrusion has, for example, a cylindrical protruding shape, but may have other shapes.

The second interlocking section 611 pivots the b-th cover section 31*b* from the open state to the covering state when the b-th placement section 21*b* pivots from the stored state to the use state, and pivots the b-th cover section 31*b* from the covering state to the open state when the b-th placement section 21*b* pivots from the use state to the stored state.

The b-th cover section 31*b* in the open state is in a posture along the b-th placement section 21*b* in the stored state. In the present embodiment, the sheet feeding port 111 (not shown) is located between the 1b-th pivot shaft J1*b* of the b-th placement section 21*b* and the 2b-th pivot shaft J2*b* of the b-th cover section 31*b*.

Here, in an aspect where the b-th cover section 31*b* in the open state is in a posture along the b-th placement section 21*b* in the stored state, the posture is not necessarily parallel to the b-th placement section 21*b*, and for example, the posture may be in an oblique direction with respect to the b-th placement section 21*b*.

In the present embodiment, in the second interlocking section 611, the arm 631, which is an example of a guided section, is pivotably provided on the b-th placement section 21*b*. That is, in the present embodiment, the guided section is the arm 631 pivotably provided on the b-th placement section 21*b*. In the present embodiment, in the second interlocking section 611, the second rail section 632, which is an example of a guide section, is provided on the b-th cover section 31*b*, and a hole 671 for guiding the free end 651 of the arm 631 is formed in it. That is, in the present embodiment, the guide section is the second rail section 632 provided in the b-th cover section 31*b* and having the hole 671 for guiding the free end 651 of the arm 631 formed therein.

In the present embodiment, the hole 671 of the second rail section 632 is an elongated hole formed in an outer surface in the width direction of the b-th cover section 31*b*, and is fitted to a cylindrical section, which is a cylindrical portion of the free end 651 of the arm 631.

As a result, in the present embodiment, the arm 631 and the second rail section 632 form a link section which is always connected to each other.

The second rail section 632 includes a rail-shaped portion extending from a tip end to the opposite side in a direction extending from the 2b-th pivot shaft J2*b* of the b-th cover section 31*b*. The portion corresponds to the hole 671. Note that the hole 671 may be referred to as a groove or the like.

In the present embodiment, the free end 651 of the arm 631 is fitted to a rail-shaped portion of the second rail section 632.

Note that as another configuration example, a configuration in which a guided section is provided on the b-th cover section 31*b* and a guide section is provided on the b-th placement section 21*b* may be used.

That is, the second interlocking section 611 includes a guided section provided on one of the b-th placement section 21*b* and the b-th cover section 31*b*, and a guide section provided on the other of the b-th placement section 21*b* and the b-th cover section 31*b* and that guides the guided section.

In the first arm state shown in FIG. 25, in the second interlocking section 611, the free end 651 of the arm 631 is located at a tip end of the second rail section 632. The tip end represents a tip end in a direction in which the b-th cover section 31*b* extends from the 2b-th pivot shaft J2*b* of the b-th cover section 31*b*.

In this embodiment, the tip end of the second rail section 632 is enclosed, and the opposite side of the tip end is also enclosed.

In this state, the direction in which the b-th cover section 31*b* extends from the 2b-th pivot shaft J2*b* is the front surface direction of the b-th recording device 1*b* with respect to the 2b-th pivot shaft J2*b* with respect to the front-rear direction of the b-th recording device 1*b*.

In the second arm state shown in FIG. 26, the b-th placement section 21*b* starts to open toward the use state about the 1b-th pivot shaft J1*b*. In this state, in the second interlocking section 611, the free end 651 of the arm 631 is located at a tip end of the second rail section 632. In this state, a direction in which the b-th cover section 31*b* extends from the 2b-th pivot shaft J2*b* is the front surface direction of the b-th recording device 1*b* with respect to the 2b-th pivot shaft J2*b*.

In the third arm state shown in FIG. 27, the b-th placement section 21*b* is further open toward the use state about the 1b-th pivot shaft J1*b*. In this state, in the second interlocking section 611, the free end 651 of the arm 631 is located at the tip end of the second rail section 632. In this state, a direction in which the b-th cover section 31*b* extends from the 2b-th pivot shaft J2*b* is the front surface direction of the b-th recording device 1*b* with respect to the 2b-th pivot shaft J2*b*, and is near to the upper direction.

In the fourth arm state shown in FIG. 28, the b-th placement section 21*b* is further open toward the use state about the 1b-th pivot shaft J1*b*. In this state, in the second interlocking section 611, the free end 651 of the arm 631 is located at the tip end of the second rail section 632. In this state, a direction in which the b-th cover section 31*b* extends from the 2b-th pivot shaft J2*b* is in the vicinity of the upper direction and is the rear surface direction of the b-th recording device 1*b* with respect to the 2b-th pivot shaft J2*b*.

In the fifth arm state shown in FIG. 29, the b-th placement section 21*b* is further open toward the use state about the 1b-th pivot shaft J1*b*. In this state, a direction of the b-th placement section 21*b* extending from the 1b-th pivot shaft J1*b* is near the upper direction. In this state, in the second interlocking section 611, the free end 651 of the arm 631 has moved toward the opposite side from the tip end of the second rail section 632. In this state, a direction in which the b-th cover section 31*b* extends from the 2b-th pivot shaft J2*b* is the rear surface direction of the b-th recording device 1*b* with respect to the front-rear direction of the b-th recording device 1*b*.

In the example of FIG. 29, the free end 651 of the arm 631 has moved in the hole 671 of the second rail section 632 and is transitioning to the use position of the b-th placement section 21*b*.

In the sixth arm state shown in FIG. 30, a direction in which the b-th placement section 21*b* extends from the 1b-th pivot shaft J1*b* is the rear surface direction of the b-th recording device 1*b* with respect to the 1b-th pivot shaft J1*b* with respect to the front-rear direction of the b-th recording device 1*b*. In this state, in the second interlocking section 611, the free end 651 of the arm 631 is located at an end of the hole 671 opposite to the tip end of the second rail section 632. In this state, a direction in which the b-th cover section 31*b* extends from the 2b-th pivot shaft J2*b* is near the rear surface direction of the b-th recording device 1*b* with respect to the front-rear direction of the b-th recording device 1*b*.

As described above, in the b-th recording device 1*b* according to the present embodiment, the second interlocking section 611 includes a guided section provided in one of the b-th placement section 21*b* and the b-th cover section 31*b*, and a guide section provided in the other of the b-th placement section 21*b* and the b-th cover section 31*b* and that guides the guided section.

Therefore, in the b-th recording device 1*b* according to the present embodiment, it is possible to realize interlocking by the guide section guiding the guided section, for example, since a drive source or the like is unnecessary, it is possible to realize interlocking with a simple configuration.

Note that the b-th recording device 1*b* is an example of a recording device, the b-th placement section 21*b* is an example of a placement section, the b-th cover section 31*b* is an example of a cover section, and the second interlocking section 611 is an example of an interlocking section.

The b-th upper cover 41*b* is an example of an upper cover, the 1b-th pivot shaft is an example of a pivot shaft of the b-th placement section 21*b*, and the 2b-th pivot shaft J2*b* is an example of a pivot shaft of the b-th cover section 31*b*.

The eleventh pivot shaft J11 is an example of a pivot shaft of the pivotable first base end 652 of the arm 631.

The guide section may be provided in either the b-th placement section 21*b* or the b-th cover section 31*b*, and the guided section may be provided in the other section.

In the b-th recording device 1*b* according to the present embodiment, the guided section is the arm 631 pivotably provided on the b-th placement section 21*b*.

The guide section is the second rail section 632, which is provided on the b-th cover section 31*b* and in which the hole 671 for guiding the free end 651 of the arm 631 is formed.

Note that the second rail section 632 is an example of a rail section.

Therefore, in the b-th recording device 1*b* according to the present embodiment, by adopting a link mechanism in which the arm 631 provided in the b-th placement section 21*b* is guided by a rail provided in the b-th cover section 31*b*, it is possible to realize interlocking with a simple configuration. In particular, in the b-th recording device 1*b* according to the present embodiment, by adopting a configuration in which the free end 651 of the arm 631 is guided by the hole 671, it is possible to prevent the b-th cover section 31*b* from being kept open in a state where the b-th placement section 21*b* is open, and it is possible to more effectively suppress foreign matter from falling into the sheet feeding port 111.

Here, the hole 671 may be a through hole, or may be a hole that does not penetrate. For example, the hole 671 may not necessarily be a through hole as long as the free end 651 does not separate from it.

For example, a configuration may be adopted in which the arm 631 completely overlaps the b-th cover section 31*b* in a state in which the b-th placement section 21*b* and the b-th cover section 31*b* are closed, and in this case, it is possible to more effectively achieve miniaturization.

A modification of the second embodiment will be described.

Figure 31:
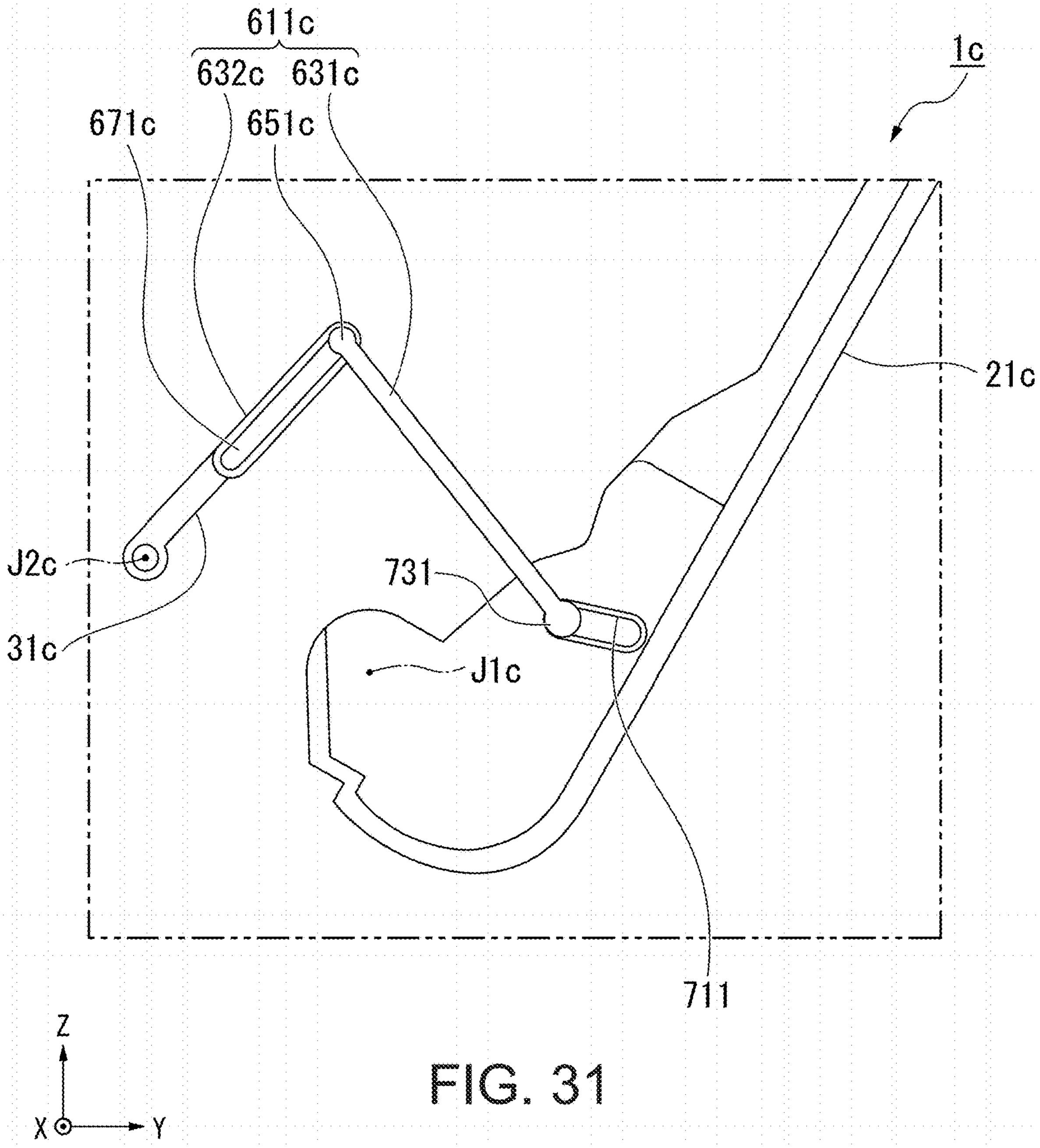
FIG. 31 is a view showing a configuration example of a 2c-th interlocking section of a c-th recording device according to a modification of the second embodiment.

With reference to FIG. 31, a c-th recording device 1*c* including a 2c-th interlocking section 611*c* according to the modification will be described.

In the description of the present modification, the configuration of the c-th recording device 1*c* in the vicinity of the 2c-th interlocking section 611*c* will be shown and described. The constituent sections of the c-th recording device 1*c*, other than the 2c-th interlocking section 611*c*, are the same as, for example, the constituent sections of the b-th recording device 1*b* according to the second embodiment, and will be described using the same reference symbols as in the second embodiment as necessary.

FIG. 31 is a view showing a configuration example of the 2c-th interlocking section 611*c* of the c-th recording device 1*c* according to the modification of the second embodiment.

FIG. 31 shows X-Y-Z orthogonal coordinate axes similar to those of FIG. 1.

FIG. 31 shows a c-th placement section 21*c* and a c-th cover section 31*c* as constituent sections of the c-th recording device 1*c*. FIG. 31 shows a 1c-th pivot shaft J1*c* of the c-th placement section 21*c* and a 2c-th pivot shaft J2*c* of the c-th cover section 31*c*.

The 2c-th interlocking section 611*c* includes a c-th arm 631*c*, a 2c-th rail section 632*c*, and an elongated hole 711 provided in the c-th placement section 21*c*.

The 2c-th rail section 632*c* is provided on the c-th cover section 31*c*.

The 2c-th rail section 632*c* includes, for example, the same configuration as the second rail section 632 according to the second embodiment, and includes a c-th hole 671*c*.

The elongated hole 711 is provided outside the c-th placement section 21*c* in the width direction of the c-th recording device 1*c*.

In the example of FIG. 31, the elongated hole 711 is a hole extending in a direction obliquely shifted to a side of the 1c-th pivot shaft J1*c* from a direction perpendicular to a direction in which the c-th placement section 21*c* extends.

The c-th arm 631*c* has a substantially rod-like shape, one end thereof is a c-th free end 651*c*, and the other end thereof is a second base end 731.

The c-th free end 651*c* includes the same configuration as the free end 651 according to the second embodiment, and as in the case of the second embodiment, it is movably fitted to the c-th hole 671*c* of the 2c-th rail section 632*c*.

The second base end 731 has a shape protruding toward the elongated hole 711, and is fitted in the elongated hole 711 so as to be movable within the elongated hole 711.

As in the example of FIG. 31, the elongated hole 711 is provided on an outer surface in the width direction of the c-th placement section 21*c*, and by setting the elongated hole 711 as a rotation center of the second base end 731 of the c-th arm 631*c*, a degree of freedom is created whereby the c-th cover section 31*c* can be independently opened and closed.

By this, for example, when a user sets the medium M1 on the c-th placement section 21*c*, the c-th cover section 31*c* can be opened to an angle substantially parallel to the c-th placement section 21*c*, and insertion of the medium M1 can be prevented from being hindered by the c-th cover section 31*c*.

Note that for example, a biasing section (not shown) that biases the second base end 731 of the c-th arm 631*c* toward the rear of the c-th recording device 1*c* to the c-th arm 631*c*, or a biasing section (not shown) that biases the c-th cover section 31*c* toward the covering state to the c-th cover section 31*c*, may be provided.

The 2c-th interlocking section 611*c* pivots the c-th cover section 31*c* from the open state to the covering state when the c-th placement section 21*c* pivots from the stored state to the use state, and pivots the c-th cover section 31*c* from the covering state to the open state when the c-th placement section 21*c* pivots from the use state to the stored state.

The c-th cover section 31*c* in the open state is in a posture along the c-th placement section 21*c* in the stored state. In the present modification, the sheet feeding port 111 (not shown) is located between the 1c-th pivot shaft J1*c* of the c-th placement section 21*c* and the 2c-th pivot shaft J2*c* of the c-th cover section 31*c*.

Here, in an aspect where the c-th cover section 31*c* in the open state is in a posture along the c-th placement section 21*c* in the stored state, the posture may not necessarily be parallel to the c-th placement section 21*c*, and for example, the posture may be in an oblique direction with respect to the c-th placement section 21*c*.

In the present modification, the elongated hole 711 for holding the second base end 731 of the c-th arm 631*c* is formed on the c-th placement section 21*c*.

In the present modification, in the 2c-th interlocking section 611*c*, the c-th arm 631*c*, which is an example of a guided section, is pivotably provided in the elongated hole 711 of the c-th placement section 21*c*. That is, in the present modification, the guided section is the c-th arm 631*c* pivotably provided to the c-th placement section 21*c*.

In the present modification, in the 2c-th interlocking section 611*c*, the 2c-th rail section 632*c*, which is an example of a guide section, is provided on the c-th cover section 31*c*, and the c-th hole 671*c*, which guides the c-th free end 651*c* of the c-th arm 631*c*, is formed. That is, in the present modification, the guide section is the 2c-th rail section 632*c*, which is provided on the c-th cover section 31*c* and in which is formed the c-th hole 671*c* for guiding the c-th free end 651*c* of the c-th arm 631*c*.

Note that as another configuration example, a configuration may be used in which a guided section is provided in the c-th cover section 31*c* and a guide section is provided in the c-th placement section 21*c*.

That is, the 2c-th interlocking section 611*c* includes a guided section provided to one of the c-th placement section 21*c* and the c-th cover section 31*c* and a guide section provided in the other of the c-th placement section 21*c* and the c-th cover section 31*c* and that guides the guided section.

As described above, in the c-th recording device 1*c* according to the modification of the second embodiment, the elongated hole 711 for holding the second base end 731 of the c-th arm 631*c* is formed on the c-th placement section 21*c*.

Therefore, in the c-th recording device 1*c* according to the present modification, by using the elongated hole 711 having play of movement in the second base end 731 of the c-th arm 631*c*, when setting the medium M1, since just the c-th cover section 31*c* can be pivoted, it is easy to set the medium M1.

Note that the c-th recording device 1*c* is an example of a recording device, the c-th placement section 21*c* is an example of a placement section, the c-th cover section 31*c* is an example of a cover section, the 2c-th interlocking section 611*c* is an example of an interlocking section, the c-th arm 631*c* is an example of an arm, the second base end 731 is an example of a base end, the 2c-th rail section 632*c* is an example of a rail section, the c-th hole 671*c* is an example of a hole.

The 1c-th pivot shaft J1*c* is an example of a pivot shaft of the c-th placement section 21*c*, and the 2c-th pivot shaft J2*c* is an example of a pivot shaft of the c-th cover section 31*c*.

Note that in the present modification, a case where the elongated hole 711 is provided in the c-th placement section 21*c* is shown, as another example, instead of the elongated hole 711, or together with the elongated hole 711, the c-th cover section 31*c* may be configured to include a mechanism such as an elongated hole to allow for movement play.

Although the embodiments have been described in detail with reference to the drawings, specific configurations are not limited to the embodiments, and designs and the like within the scope not departing from the gist of the present disclosure are also included.

Configuration examples will be described below.

Note that a lower-level configuration example may or may not be applied to a higher-level configuration example.

A lower-level configuration example applicable to any of the two or more higher-level configuration examples may be applied to any configuration example of the two or more higher-level configuration examples, that is, two or more application examples may occur, and a configuration example lower than the lower-level configuration example may be applied to any application example of the two or more application examples.

First Configuration Example

A recording device including a placement section configured to pivot about a first pivot shaft between a use state and a stored state, the placement section being configured to support a medium to be recorded on by a recording section in the use state and configured not to support the medium in the stored state; a housing that accommodates the recording section and in which is formed a sheet feeding port through which the medium supported on the placement section passes; a cover section configured to pivot about a second pivot shaft between a covering state that covers at least a part of the sheet feeding port and an open state that opens up the sheet feeding port; and an interlocking section that pivots the cover section from the open state to the covering state when the placement section pivots from the stored state to the use state, and that pivots the cover section from the covering state to the open state when the placement section pivots from the use state to the stored state, wherein the cover section in the open state is in a posture along the placement section in the stored state and the sheet feeding port is between the first pivot shaft and the second pivot shaft.

Second Configuration Example

The recording device according to the first configuration example, wherein the interlocking section includes a guided section provided on one of the placement section and the cover section, and a guide section provided on the other of the placement section and the cover section and configured to guide the guided section.

Third Configuration Example

The recording device according to the second configuration example, wherein the guided section is a protrusion provided on the cover section and the guide section is a first rail section provided on the placement section and configured to guide the protrusion.

Fourth Configuration Example

The recording device according to the third configuration example, wherein the first rail section includes a first portion configured to sandwich and guide the protrusion, and a second portion configured to guide the protrusion by contacting the protrusion.

Fifth Configuration Example

The recording device according to the fourth configuration example, wherein the cover section rises in a vertical direction from the open state while the first portion guides the protrusion.

Sixth Configuration Example

The recording device according to the fourth configuration example or the fifth configuration example, wherein when the placement section is in the use state and the cover section is in the covering state, the protrusion is not in contact with the first rail section.

Seventh Configuration Example

The recording device according to any one of the fourth to sixth configuration examples, wherein a passing region through which the protrusion is passable is formed in the first portion in a direction intersecting a guide direction in which the protrusion is guided, the first rail section includes an opening and closing section configured to open and close the passing region, and the passing region is provided at a position facing the protrusion when the placement section is in the stored state and the cover section is in the open state.

Eighth Configuration Example

The recording device according to the second configuration example, wherein the guided section is an arm provided pivotable with respect to the placement section and the guide section is a second rail section provided in the cover section and formed with a hole for guiding a free end of the arm.

Ninth Configuration Example

The recording device according to the eighth configuration example, wherein the placement section is formed with an elongated hole for holding a base end of the arm.

Tenth Configuration Example

The recording device according to any one of the first to ninth configuration examples, further including a biasing section configured to bias the cover section to the covering state.

Eleventh Configuration Example

The recording device according to any one of the first to tenth configuration examples, further including an upper cover configured to pivot with respect to the housing about a third pivot shaft, wherein the third pivot shaft is located at an end section of the upper cover located between the cover section in the open state and the placement section in the use state and the cover section is provided pivotable with respect to the upper cover.

Twelfth Configuration Example

The recording device according to any one of the first to tenth configuration examples, further including reading unit that reads a document and an upper cover configured to pivot with respect to the reading unit about a third pivot shaft, wherein the placement section is configured and provided so as to pivot with respect to the housing.

Thirteenth Configuration Example

The recording device according to any one of the first to twelfth configuration examples, wherein the first pivot shaft is located below the second pivot shaft.

What is claimed is:

1. A recording device comprising:

a placement section configured to pivot about a first pivot shaft between a use state and a stored state, the placement section being configured to support a medium to be recorded on by a recording section in the use state and configured not to support the medium in the stored state;

a housing that accommodates the recording section and in which is formed a sheet feeding port through which the medium supported on the placement section passes;

a cover section configured to pivot about a second pivot shaft between a covering state that covers at least a part of the sheet feeding port and an open state that opens up the sheet feeding port; and an interlocking section that pivots the cover section from the open state to the covering state when the placement section pivots from the stored state to the use state, and that pivots the cover section from the covering state to the open state when the placement section pivots from the use state to the stored state, wherein the cover section in the open state is in a posture along the placement section in the stored state and the sheet feeding port is between the first pivot shaft and the second pivot shaft.

2. The recording device according to claim 1, wherein the interlocking section includes a guided section provided on one of the placement section and the cover section, and a guide section provided on the other of the placement section and the cover section and configured to guide the guided section.

3. The recording device according to claim 2, wherein the guided section is a protrusion provided on the cover section, and the guide section is a first rail section provided on the placement section and configured to guide the protrusion.

4. The recording device according to claim 3, wherein the first rail section includes a first portion configured to sandwich and guide the protrusion, and a second portion configured to guide the protrusion by contacting the protrusion.

5. The recording device according to claim 4, wherein the cover section rises in a vertical direction from the open state while the first portion guides the protrusion.

6. The recording device according to claim 4, wherein when the placement section is in the use state and the cover section is in the covering state, the protrusion is not in contact with the first rail section.

7. The recording device according to claim 4, wherein a passing region through which the protrusion is passable is formed in the first portion in a direction intersecting a guide direction in which the protrusion is guided, the first rail section includes an opening and closing section configured to open and close the passing region, and the passing region is provided at a position facing the protrusion when the placement section is in the stored state and the cover section is in the open state.

8. The recording device according to claim 2, wherein the guided section is an arm provided pivotable with respect to the placement section, and the guide section is a second rail section provided in the cover section and formed with a hole for guiding a free end of the arm.

9. The recording device according to claim 8, wherein the placement section is formed with an elongated hole for holding a base end of the arm.

10. The recording device according to claim 1, further comprising:

a biasing section configured to bias the cover section to the covering state.

11. The recording device according to claim 1, further comprising:

an upper cover configured to pivot with respect to the housing about a third pivot shaft, wherein the third pivot shaft is located at an end section of the upper cover located between the cover section in the open state and the placement section in the use state, and the cover section is provided pivotable with respect to the upper cover.

12. The recording device according to claim 1, further comprising:

a reading unit that reads a document, and an upper cover configured to pivot with respect to the reading unit about a third pivot shaft, wherein the placement section is configured and provided so as to pivot with respect to the housing.

13. The recording device according to claim 1, wherein the first pivot shaft is located below the second pivot shaft.

14. A recording device comprising:

a placement section configured to support a medium to be recorded on by a recording section in a use state and configured not to support the medium in a stored state;

a housing that accommodates the recording section and in which is formed a sheet feeding port through which the medium supported on the placement section passes;

a cover section configured to cover at least a part of the sheet feeding port and an open state that opens up the sheet feeding port; and an interlocking section that pivots the cover section from the open state to a covering state when the placement section pivots from the stored state to the use state, and that pivots the cover section from the covering state to the open state when the placement section pivots from the use state to the stored state, wherein the placement section in the stored state covers the sheet feeding port.

* * * * *